(12) United States Patent
Kajikawa et al.

(10) Patent No.: US 10,926,583 B2
(45) Date of Patent: Feb. 23, 2021

(54) METHOD FOR MANUFACTURING AUTOMOBILE KNUCKLE AND AUTOMOBILE KNUCKLE

(71) Applicant: MAZDA MOTOR CORPORATION, Hiroshima (JP)

(72) Inventors: Hisashi Kajikawa, Hiroshima (JP); Eiichi Tanaka, Hiroshima (JP); Mitsuo Iwano, Higashihiroshima (JP); Junki Kitano, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 246 days.

(21) Appl. No.: 16/088,042

(22) PCT Filed: Mar. 29, 2017

(86) PCT No.: PCT/JP2017/013004
§ 371 (c)(1),
(2) Date: Sep. 24, 2018

(87) PCT Pub. No.: WO2017/212751
PCT Pub. Date: Dec. 14, 2017

(65) Prior Publication Data
US 2020/0238759 A1 Jul. 30, 2020

(30) Foreign Application Priority Data
Jun. 6, 2016 (JP) .............................. JP2016-112617

(51) Int. Cl.
*B22C 9/10* (2006.01)
*B22D 25/02* (2006.01)
(Continued)

(52) U.S. Cl.
CPC ................ *B60B 35/18* (2013.01); *B22C 9/10* (2013.01); *B60G 7/001* (2013.01); *B62D 7/18* (2013.01)

(58) Field of Classification Search
CPC ........... B22C 9/10; B22D 25/02; B60B 35/18; B60G 7/00; B60G 7/001; B62D 7/18
(Continued)

(56) References Cited

U.S. PATENT DOCUMENTS 413,674 A * 10/1889 Kinzer ...................... B22C 9/10
164/366
9,643,647 B2 * 5/2017 Conner .................. B60G 7/001
(Continued)

FOREIGN PATENT DOCUMENTS

| JP | 2001-187583 A | 7/2001 |
|---|---|---|
| JP | 2013-144542 A | 7/2013 |
| WO | 2014006315 A1 | 1/2014 |

*Primary Examiner* — Kevin P Kerns
(74) *Attorney, Agent, or Firm* — Alleman Hall Creasman & Tuttle LLP

(57) ABSTRACT

Provided is a method for manufacturing a knuckle that includes a bearing mounting portion on which a hub bearing is mounted, a damper holding portion which holds a damper, and a damper mounting arm portion which couples the bearing mounting portion and the damper holding portion, the method being such that by using one core, the knuckle is integrally casted so as to formed therein a cylindrical opening which is the inner space of the damper holding portion, a hollow opening in which the inner space in a hollow portion of the damper mounting arm portion, the hollow portion extending in a closed cross section from the damper holding portion, is continuous with an opening formed in the damper holding portion, and an arm-portion opening which is surrounded by a front arm portion and a rear arm portion of the damper mounting arm portion, extending from the hollow portion.

8 Claims, 12 Drawing Sheets

(51) Int. Cl.
  *B60B 35/18*  (2006.01)
  *B60G 7/00*  (2006.01)
  *B62D 7/18*  (2006.01)

(58) Field of Classification Search
  USPC .................................................. 164/137, 369
  See application file for complete search history.

(56) References Cited

U.S. PATENT DOCUMENTS

2013/0181421 A1   7/2013  Rohde et al.
2017/0232503 A1*  8/2017  Nibouar et al. .......... B22C 9/10
                                                  164/138

* cited by examiner

4 ··· Front wheel  20 ··· Damper  40 ··· Hub bearing  50 ··· Knuckle  51 ··· Bearing mounting portion 20 ··· Damper
51 ··· Bearing mounting portion
544 ··· Hollow portion
S3 ··· Arm-portion opening 40 ··· Hub bearing
541 ··· Damper holding portion
545 ··· Front arm portion 50 ··· Knuckle
542 ··· Damper mounting arm portion
546 ··· Rear arm portion 40 ··· Hub bearing
50 ··· Knuckle
51 ··· Bearing mounting portion
541 ··· Damper holding portion
542 ··· Damper mounting arm portion
544 ··· Hollow portion
545 ··· Front arm portion
546 ··· Rear arm portion 40 ··· Hub bearing
50 ··· Knuckle
51 ··· Bearing mounting portion
541 ··· Damper holding portion
542 ··· Damper mounting arm portion
544 ··· Hollow portion
545 ··· Front arm portion
546 ··· Rear arm portion 50 ⋯ Knuckle
51 ⋯ Bearing mounting portion
541 ⋯ Damper holding portion
542 ⋯ Damper mounting arm portion
544 ⋯ Hollow portion
545 ⋯ Front arm portion
546 ⋯ Rear arm portion
S1 ⋯ Cylindrical opening
S2 ⋯ Hollow opening
S3 ⋯ Arm-portion opening 50 ··· Knuckle
544 ··· Hollow portion
S2 ··· Hollow opening 51 ··· Bearing mounting portion
545 ··· Front arm portion
S3 ··· Arm-portion opening 542 ··· Damper mounting arm portion
546 ··· Rear arm portion 50 ··· Knuckle
545 ··· Front arm portion
546 ··· Rear arm portion
S3 ··· Arm-portion opening 51 ··· Bearing mounting portion
545a ··· Flange portion
546a ··· Flange portion 542 ··· Damper mounting arm portion
545b ··· Flat plate portion
546b ··· Flat plate portion 50 ··· Knuckle
545 ··· Front arm portion
546 ··· Rear arm portion
S3 ··· Arm-portion opening 51 ··· Bearing mounting portion
545a ··· Flange portion
546a ··· Flange portion 542 ··· Damper mounting arm portion
545b ··· Flat plate portion
546b ··· Flat plate portion 4 ··· Front wheel  20 ··· Damper  50 ··· Knuckle  51 ··· Bearing mounting portion

Fig. 11

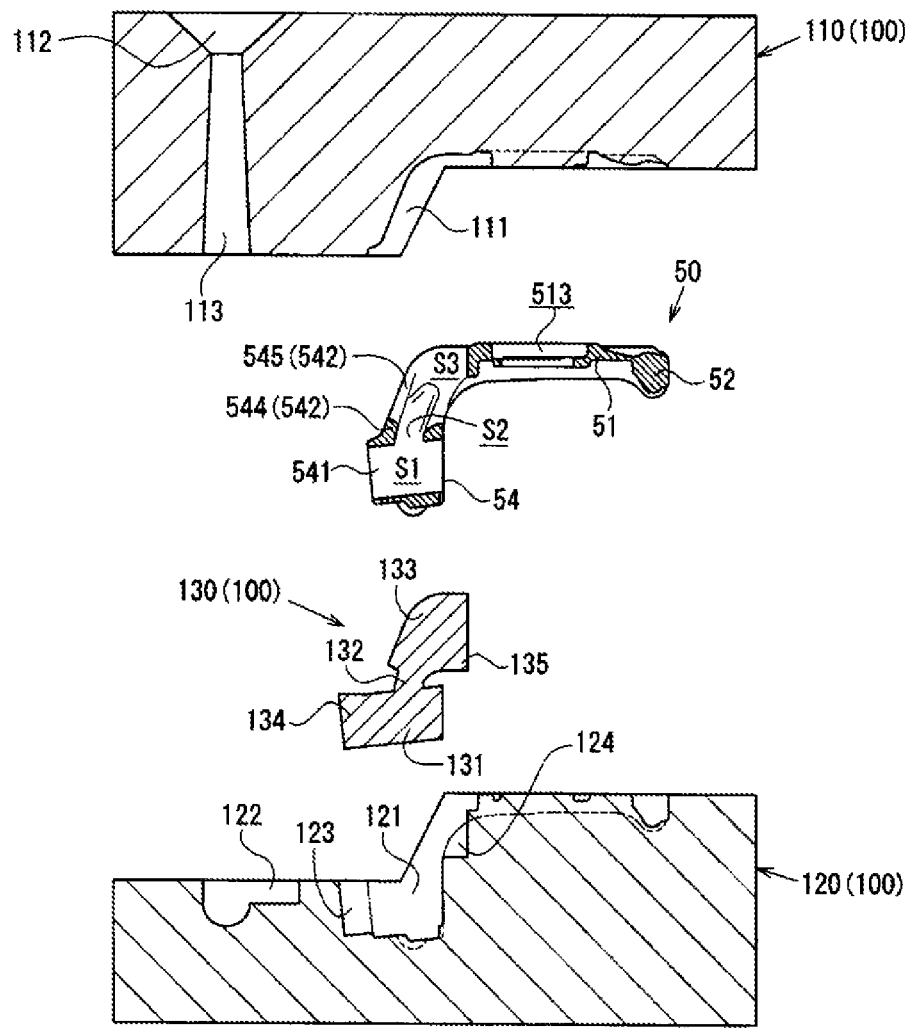

50 ··· Knuckle
120 ··· Lower main mold
133 ··· Arm-portion opening corresponding portion
541 ··· Damper holding portion
545 ··· Front arm portion
S3 ··· Arm-portion opening 51 ··· Bearing mounting portion
130 ··· Core
134 ··· First core print portion
542 ··· Damper mounting arm portion
S1 ··· Cylindrical opening 110 ··· Upper main mold
131 ··· Cylindrical opening corresponding portion
135 ··· Second core print portion
544 ··· Hollow portion
S2 ··· Hollow opening

METHOD FOR MANUFACTURING AUTOMOBILE KNUCKLE AND AUTOMOBILE KNUCKLE

TECHNICAL FIELD

The present invention relates to an automobile knuckle which supports, for example, a wheel of an automobile through a hub bearing, and a method for manufacturing the automobile knuckle.

BACKGROUND ART

In a stmt-type suspension as disclosed in PTL 1 which is a suspension device supporting a wheel of an automobile, it is known that, when repeated loads in the vehicle vertical direction caused by the automobile traveling on an uneven load surface is input to the wheel, loads in rotation directions act on an automobile knuckle and the wheel such that the automobile knuckle and the wheel are rotated relative to each other in reverse directions, as viewed from the front, with a hub bearing as the rotation center.

At this time, in the case of an automobile knuckle which is easily warped and deformed in its entirety, since the automobile knuckle is warped in the vehicle width direction in its entirety due to the load in the rotation direction acting on the automobile knuckle, the load in the vehicle width direction is more easily transmitted to a lower arm.

However, since the lower arm is harder to swing in the vehicle width direction than to swing in the vehicle vertical direction, the lower arm cannot sufficiently block or absorb the load in the vehicle width direction by swinging in the vehicle width direction. Therefore, there is a problem that repeated loads in the vehicle vertical direction applied to the wheel are easily transmitted as vibration to a vehicle body through the automobile knuckle.

Regarding such a problem, the applicant has found that it is possible to solve the above-described problem by providing a easily deformable portion which is easily deformed by a load in the vehicle vertical direction applied to a wheel, the easily deformable portion being provided at a vehicle upper portion with respect to the upper end of a hub bearing in an automobile knuckle including a damper mounting portion on which a damper is mounted, a bearing mounting portion on which a hub bearing is mounted, and a mounting arm portion which couples the damper mounting portion and the bearing mounting portion.

More specifically, when a load in the rotation direction acts on the automobile knuckle, the automobile knuckle is warped and deformed such that the damper mounting portion and the mounting arm portion are bent with respect to the bearing mounting portion around the easily deformable portion as a center. Thus, the automobile knuckle can suppress swinging of the bearing mounting portion in the vehicle width direction. As a result, the automobile knuckle found by the applicant can suppress the load in the vehicle width direction acting on the lower arm and suppresses transmission of vibration from the wheel to a vehicle body.

Incidentally, automobile knuckles are generally manufactured by casting, and there may be a problem that in a casting process, a gas generated in a mold and mixed into molten metal causes a casting defect (also referred to as a gas defect) in which a pore is generated inside a casting.

For example, in the case of casting an automobile knuckle having hollow portions for weight reduction in a strut mounting arm 14, a lower-arm mounting arm 15, and a knuckle arm 16 as in PTL 1, each hollow portion is formed by a core supported by a main mold through a core print.

In this case, the automobile knuckle has an opening formed by the core print of the core. The opening formed by the core print needs to be provided at a portion which does not affect mechanical strength and transmission of vibration and to have a minimum size necessary, similarly to, for example, a flat portion of a stmt mounting arm 14 of PTL 1.

However, since the opening formed by the core print is small with respect to the size of the hollow portion, a corner portion of the hollow portion is likely to have a substantially pocket shape with respect to the opening formed by the core print. Gas generated in the such corner portion with the pocket shape hardly flows to the main mold through the core print, resulting in a casting defect (gas defect).

A casting defect (gas defect) generated in this manner causes lower quality and an increase in the product defective percentage, which may reduce production efficiency. Therefore, in recent years, a new need has arisen for achieving both casting of an automobile knuckle capable of suppressing transmission of vibration from a wheel to a vehicle body and suppression of a reduction in production efficiency due to a casting defect or the like.

CITATION LIST

Patent Literature

PTL 1: JP 2001-187583 A

SUMMARY OF INVENTION

Technical Problem

In view of the above-described problem, the purpose of the present invention to provide a method for manufacturing an automobile knuckle capable of ensuring favorable castability with which the automobile knuckle capable of suppressing transmission of vibration from a wheel to a vehicle body is casted and, at the same time, production efficiency is improved, and to provide the automobile knuckle.

Solution to Problem

The present invention is a method for manufacturing an automobile knuckle including a bearing mounting portion on which a hub bearing that rotatably supports a wheel of an automobile is mounted, a damper mounting portion which has a substantially cylindrical shape and holds the lower end of a damper whose upper end is supported on a vehicle body at a vehicle upper side and a vehicle inner side with respect to the bearing mounting portion, and a mounting arm portion which couples the bearing mounting portion and the damper mounting portion. The method includes: disposing one core in a main mold, the one core including a portion corresponding to a cylindrical opening which is an inner space of the damper mounting portion, a portion corresponding to a hollow opening in which an inner space in a hollow portion of the mounting arm portion is continuous with an opening formed in the damper mounting portion, the hollow portion extending in a closed cross section from an outer peripheral surface of the damper mounting portion, and a portion corresponding to an arm-portion opening which is surrounded by a front arm portion of the mounting arm portion and a rear arm portion of the mounting arm portion, the front arm portion extending from the hollow portion to a front portion of the bearing mounting portion, the rear arm portion extending from the hollow portion to a rear portion of the bearing mounting portion, the arm-portion opening having an opening area larger than that of the hollow opening; pouring molten metal into the main mold in a state where the one core is supported in the main mold; and solidifying the molten metal while the molten metal is removed from a portion corresponding to the cylindrical opening, a portion corresponding to the hollow opening, and a portion corresponding to the arm-portion opening in an internal space of the main mold due to the one core, to cast the automobile knuckle which is integral.

The vehicle upper side and the vehicle inner side may be the upper side in the vehicle vertical direction and the inner side in the vehicle width direction in a state of being mounted on a vehicle, respectively.

The automobile knuckle may be a member also called a knuckle, a hub support or the like.

The front portion and the rear portion of the bearing mounting portion may be a vehicle front side and a vehicle rear side of the bearing mounting portion in a state of being mounted on a vehicle, respectively.

According to the present invention, it is possible to ensure favorable castability with which the automobile knuckle capable of suppressing transmission of vibration from the wheel to the vehicle body is casted and, at the same time, production efficiency is improved.

Specifically, for example, when the automobile knuckle in a state of being turned sideways with the damper mounting portion located at a lower side is casted by using the main molds overlapping with each other in the vertical direction and the core supported in the main molds, gas generated in the cylindrical opening of the damper mounting portion can flow from both ends of the damper mounting portion in the axial direction to the lower main mold or can flow to the hollow opening.

The gas having flowed from the cylindrical opening to the lower main mold can flow to the arm-portion opening surrounded by the front arm portion and the rear arm portion together with gas generated in the lower main mold.

In contrast, gas having flowed from the cylindrical opening to the hollow opening can flow to the arm-portion opening together with gas generated in the hollow opening.

Then, the gas having flowed from the lower main mold to the arm-portion opening and the gas having flowed from the hollow opening to the arm-portion opening can flow to the upper main mold together with gas generated in the arm-portion opening portion.

At this time, since the opening area of the arm-portion opening is larger than the opening area of the hollow opening, the gas having flowed in from the lower main mold and the hollow opening, and the gas generated in the arm-portion opening can flow to the upper main mold without staying in the arm-portion opening.

As a result, since the method for manufacturing the automobile knuckle enables gas generated in a mold to be efficiently discharged to the outside, it is possible to prevent occurrence of a casting defect due to the generated gas.

In addition, since the front arm portion and the rear arm portion are separated in the vehicle front-rear direction, in the method for manufacturing the automobile knuckle, for example, a shot blasting nozzle used for removing the core attached to the automobile knuckle can be easily disposed toward facing surfaces of the front arm portion and the rear arm portion and the hollow opening.

Therefore, for example, as compared with a case where a core is removed from a mounting arm portion having a closed cross section and coupling a bearing mounting portion and a damper mounting portion through an opening formed by a core print after casting, in the method for manufacturing the automobile knuckle, it is possible to easily remove the core attached to the facing surfaces of the front arm portion and the rear arm portion, the hollow opening, and the like by shot blasting or the like.

Therefore, according to the method for manufacturing the automobile knuckle, removal of the core attached to the automobile knuckle and polishing of a casting surface by shot blasting can be continuously performed in a time required, for example, for removing the core from the mounting arm portion having the closed cross section.

In other words, since the method for manufacturing the automobile knuckle can achieve both satisfactory gas releasability and improvement of removal work efficiency of the core, production efficiency can be improved.

Furthermore, the damper mounting portion and the bearing mounting portion are coupled by the hollow portion having the closed cross section and the front arm portion and the rear arm portion extending from the hollow portion. Therefore, in the automobile knuckle, rigidity of a bearing mounting portion side of the mounting arm portion can be made lower than that of a damper mounting portion side of the mounting arm portion.

Therefore, when a load in a rotation direction acts on the automobile knuckle, the automobile knuckle can be warped and deformed such that the damper mounting portion and the mounting arm portion are bent with respect to the bearing mounting portion, at a vehicle upper side with respect to the upper end of the hub bearing.

As described, according to the method for manufacturing the automobile knuckle, it is possible to cast the automobile knuckle capable of suppressing transmission of vibration from the wheel to the vehicle body even if production efficiency is improved.

Therefore, according to the method for manufacturing the automobile knuckle, it is possible to ensure favorable castability with which the automobile knuckle capable of suppressing transmission of vibration from the wheel to the vehicle body is casted and, at the same time, production efficiency is improved.

According to an aspect of the present invention, the one core has the portion corresponding to the arm-portion opening in which a range extending from a surface on the vehicle outer side of the bearing mounting portion to the hollow portion is opened in a vehicle vertical direction side and a vehicle width direction side, and when the molten metal is poured into the main mold in a state where the one core is supported in the main mold, the molten metal is removed from the portion corresponding to the arm-portion opening due to the one core, so that the automobile knuckle having the arm-portion opening can be casted.

According to the present invention, in the method for manufacturing the automobile knuckle, the automobile knuckle having the opening area of the arm-portion opening larger than that in a case of, for example, opening a range from a surface on the vehicle inner side of the bearing mounting portion to the hollow portion can be casted.

Thus, in the method for manufacturing the automobile knuckle, gas generated in the mold can be more reliably released to the outside through the arm-portion opening with the larger opening area, and also removal work efficiency of the core attached to the automobile knuckle can be further improved.

In addition, since the arm-portion opening is formed in the range from the surface on the vehicle outer side in the bearing mounting portion to the hollow portion, the front arm portion and the rear arm portion are formed to be continuous with the upper surface of the bearing mounting portion.

In the case of such a shape, the vicinity of the boundary between the front arm portion and the bearing mounting portion and the vicinity of the boundary between the rear arm portion and the bearing mounting portion are likely to become rigidity changing points. Therefore, in the automobile knuckle, the rigidity of the bearing mounting portion side of the mounting arm portion can be made further lower.

That is, since the damper mounting portion and the mounting arm portion can be warped and deformed integrally at a location closer to the hub bearing, the automobile knuckle can further suppress swinging of the bearing mounting portion in the vehicle width direction. As described, according to the method for manufacturing the automobile knuckle, it is possible to cast the automobile knuckle capable of suppressing transmission of vibration from the wheel to the vehicle body even if production efficiency is improved.

Therefore, according to the method for manufacturing the automobile knuckle, due to the arm-portion opening having the larger opening area, it is possible to ensure favorable castability with which the automobile knuckle capable of suppressing transmission of vibration from the wheel to the vehicle body is casted and, at the same time, production efficiency is improved.

In addition, according to an aspect of the present invention, the one core further includes a first core print portion which extends from the portion corresponding to the cylindrical portion to one side in the vehicle vertical direction, and a second core print portion which extends from the portion corresponding to the arm-portion opening to the other side in the vehicle vertical direction, and when the molten metal is poured into the main mold in a state where the core is supported in the main mold, the molten metal is removed from the portion corresponding to the cylindrical opening, the portion corresponding to the hollow opening, and the portion corresponding to the arm-portion opening due to the first core print portion and the second core print portion so that the automobile knuckle having the cylindrical opening, the hollow opening, and the arm-portion opening can be casted.

According to the present invention, the method for manufacturing the automobile knuckle can further improve castability of the automobile knuckle.

Specifically, since the second core print portion is offset to the vehicle outer side and to the other side in the vehicle vertical direction with respect to the first core print portion, the main mold can reliably support the core at two locations separated from each other in the vehicle vertical direction side and in the vehicle width direction side.

Thus, according to the method for manufacturing the automobile knuckle, positioning of the core with respect to the main mold and support rigidity of the core can be ensured at the same time. Therefore, according to the method for manufacturing the automobile knuckle, it is possible to prevent the core from being displaced in the casting process, and it is possible to cast the automobile knuckle with higher accuracy.

Furthermore, the first core print portion and the second core print portion extend from the portion corresponding to the cylindrical opening portion and the portion corresponding to the arm-portion opening, respectively. Therefore, in the method for manufacturing the automobile knuckle, the first core print portion and the second core print portion do not affect the shape of the automobile knuckle.

Therefore, according to the method for manufacturing the automobile knuckle, a designer can freely design the shapes and the sizes of the first core print portion and the second core print portion without hindering mechanical strength and vibration transmission sensitivity of the automobile knuckle. In other words, according to the method for manufacturing the automobile knuckle, design flexibility of the automobile knuckle and design flexibility of the core can be ensured at the same time.

Therefore, according to the method for manufacturing the automobile knuckle, due to the first core print portion extending from the portion corresponding to the cylindrical opening of the core and the second core print portion extending from the portion corresponding to the arm-portion opening of the core, castability of the automobile knuckle can be further improved.

In addition, as an aspect of the present invention, each of the front arm portion and the rear arm portion may include: a pair of pillar-shaped portions each of which has a predetermined thickness in the vehicle front-rear direction side, and couples the bearing mounting portion and the hollow portion with a predetermined interval in the vehicle vertical direction side; a flat plate portion which is interposed between the pair of pillar-shaped portions and has a thickness on the vehicle front-rear direction side thinner than the predetermined thickness.

The cross-section of each of front arm portion and the rear arm portion along the vehicle front-rear direction may be formed to have a substantially I-shaped cross-section, a substantially gate shaped cross-section, or the like configured of a pair of substantially pillar-shaped portions and a substantially flat plate portion.

According to the present invention, the method for manufacturing the automobile knuckle can ensure favorable castability with which the automobile knuckle having a high degree of design flexibility is casted and, at the same time, molten metal flowability in the mounting arm portion is improved.

More specifically, in order to suppress a significant reduction in rigidity of the mounting arm portion due to the arm-portion opening, the thickness of the front arm portion and the rear arm portion on the vehicle front-rear direction side of the automobile knuckle is likely to be thicker than the thickness of the mounting arm portion having the closed cross section.

Therefore, according to the method for manufacturing the automobile knuckle, it is possible to ensure that a sprue runner having a sufficient size is provided between the one core and the main mold corresponding to the front arm portion and the rear arm portion. As a result, the method for manufacturing the automobile knuckle can improve flowability of the molten metal in the front arm portion and the rear arm portion.

Further, in the automobile knuckle, rigidity of the mounting arm portion can easily be changed by adjusting the thickness of the pillar-shaped portion or the flat plate portion on the vehicle front-rear direction side as a whole or in part.

Even in this case, since the arm-portion opening having the large opening area configured of the front arm portion and the rear arm portion is easily secured, according to the method for manufacturing the automobile knuckle, the automobile knuckle with high degree of design flexibility can be casted while production efficiency is maintained.

Therefore, due to the front arm portion and the rear arm portion each of which which is configured of the pair of pillar-shaped portions and the flat plate portion, the method for manufacturing the automobile knuckle can ensure favorable castability with which the automobile knuckle having a high degree of design flexibility is casted and, at the same time, molten metal flowability in the mounting arm portion is improved.

The present invention is an automobile knuckle made of a casting including a bearing mounting portion on which a hub bearing that rotatably supports a wheel of an automobile is mounted, a damper mounting portion which has a substantially cylindrical shape and holds the lower end of a damper whose upper end is supported on a vehicle body at a vehicle upper side and a vehicle inner side with respect to the bearing mounting portion, and a mounting arm portion which couples the bearing mounting portion and the damper mounting portion. The mounting arm portion is integrally formed of a hollow portion which extends with a closed section from an outer peripheral surface of the damper mounting portion, a front arm portion which extends from the hollow portion to a front portion of the bearing mounting portion, and a rear arm portion which extends from the hollow portion to a rear portion of the bearing mounting portion. The mounting arm portion has a cylindrical opening which is an inner space of the damper holding portion, a hollow opening in which an inner space in the hollow portion of the mounting arm portion is continuous with an opening formed in the damper holding portion, and an arm-portion opening which is surrounded by the front arm portion and the rear arm portion and has an opening area larger than that of the hollow opening.

According to the present invention, it is possible to achieve both suppression of vibration transmission from the wheel to the vehicle body and improvement of production efficiency.

Advantageous Effects of Invention

According to the present invention, it is possible to provide a method for manufacturing the automobile knuckle capable of ensuring favorable castability with which the automobile knuckle capable of suppressing transmission of vibration from the wheel to the vehicle body is casted and, at the same time, production efficiency is improved, and to provide the automobile knuckle.

BRIEF DESCRIPTION OF DRAWINGS

FIG. 11 is a cross-sectional view illustrating components of a mold in cross section.

DESCRIPTION OF EMBODIMENTS

An embodiment of the present invention will be described below with reference to the drawings.

First, with reference to FIG. 1 to FIG. 9, a description will be given of a suspension device 10 to which a knuckle 50 of the present embodiment is attached in a vehicle front portion of an automobile.

Figure 1:
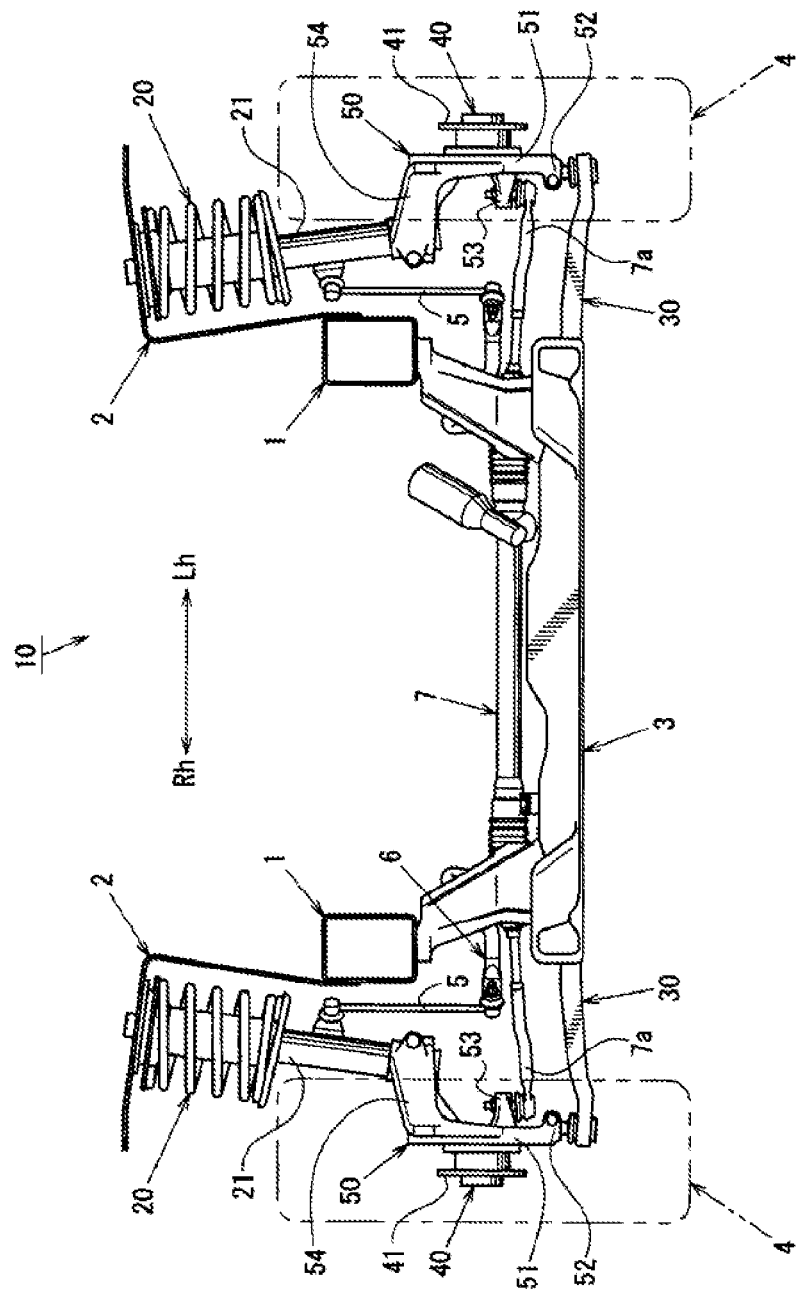
FIG. 1 is a front view illustrating an external appearance of an automobile suspension device in front view.
Figure 2:
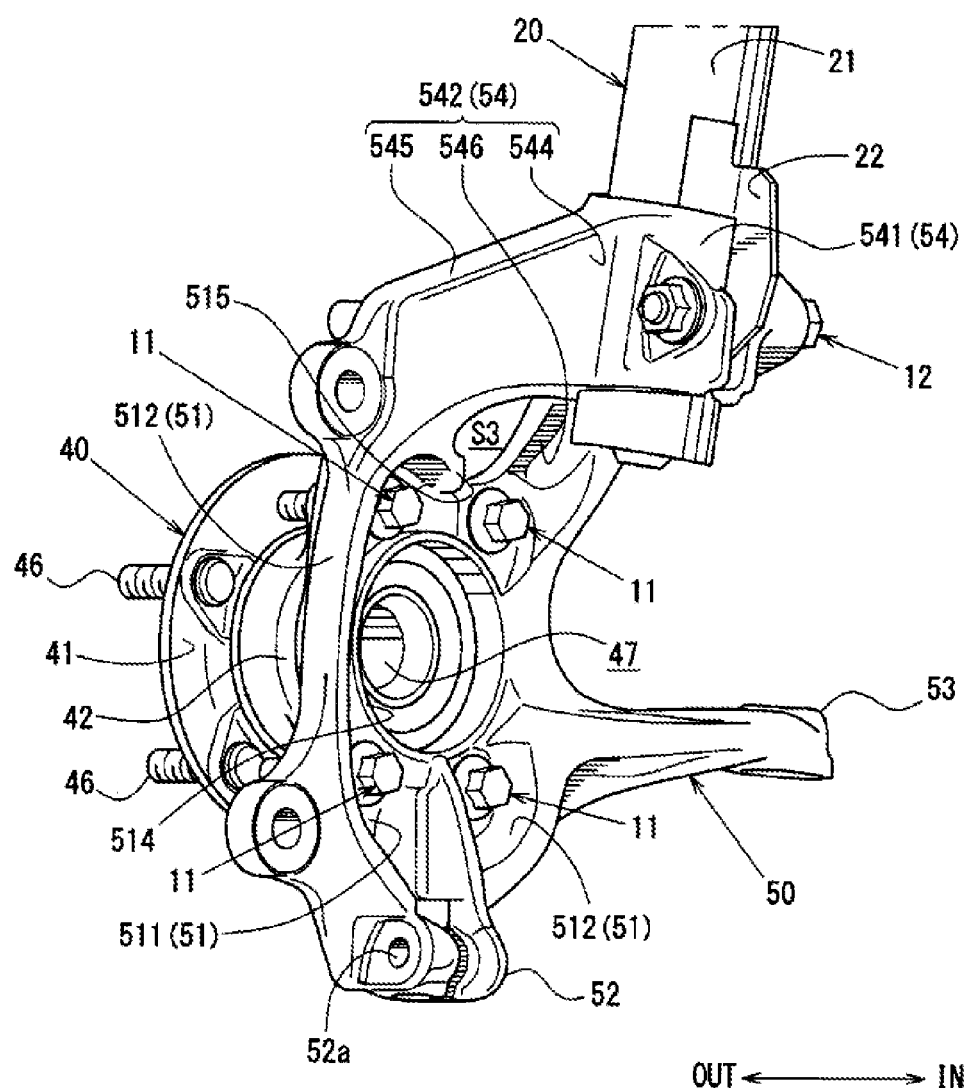
FIG. 2 is an external perspective view illustrating an external appearance of a knuckle on the right side viewed from the vehicle front inner side.
Figure 3:
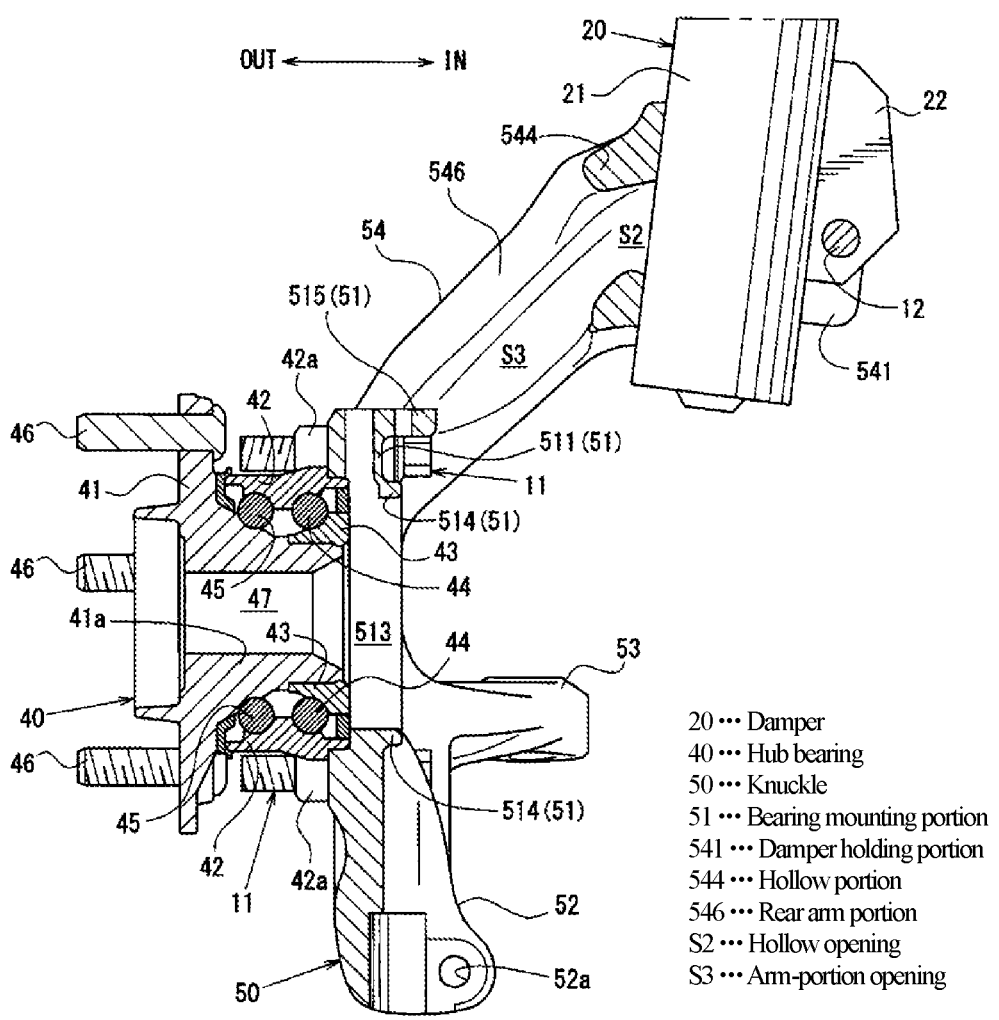
FIG. 3 is a vertical cross-sectional view illustrating a vertical cross section along the vehicle width direction of the knuckle on the right side.
Figure 4:
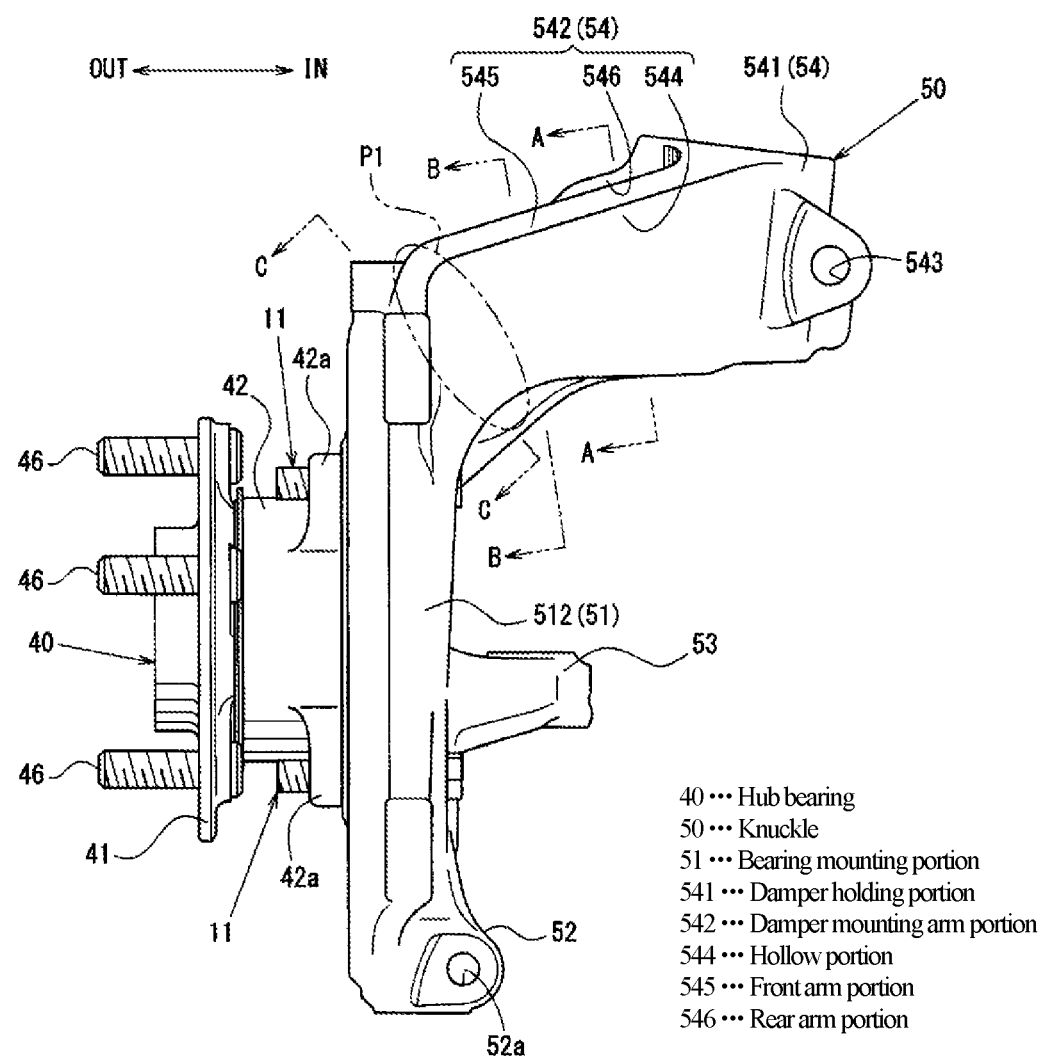
FIG. 4 is a front view illustrating the external appearance of the knuckle on the right side in front view.
Figure 5:
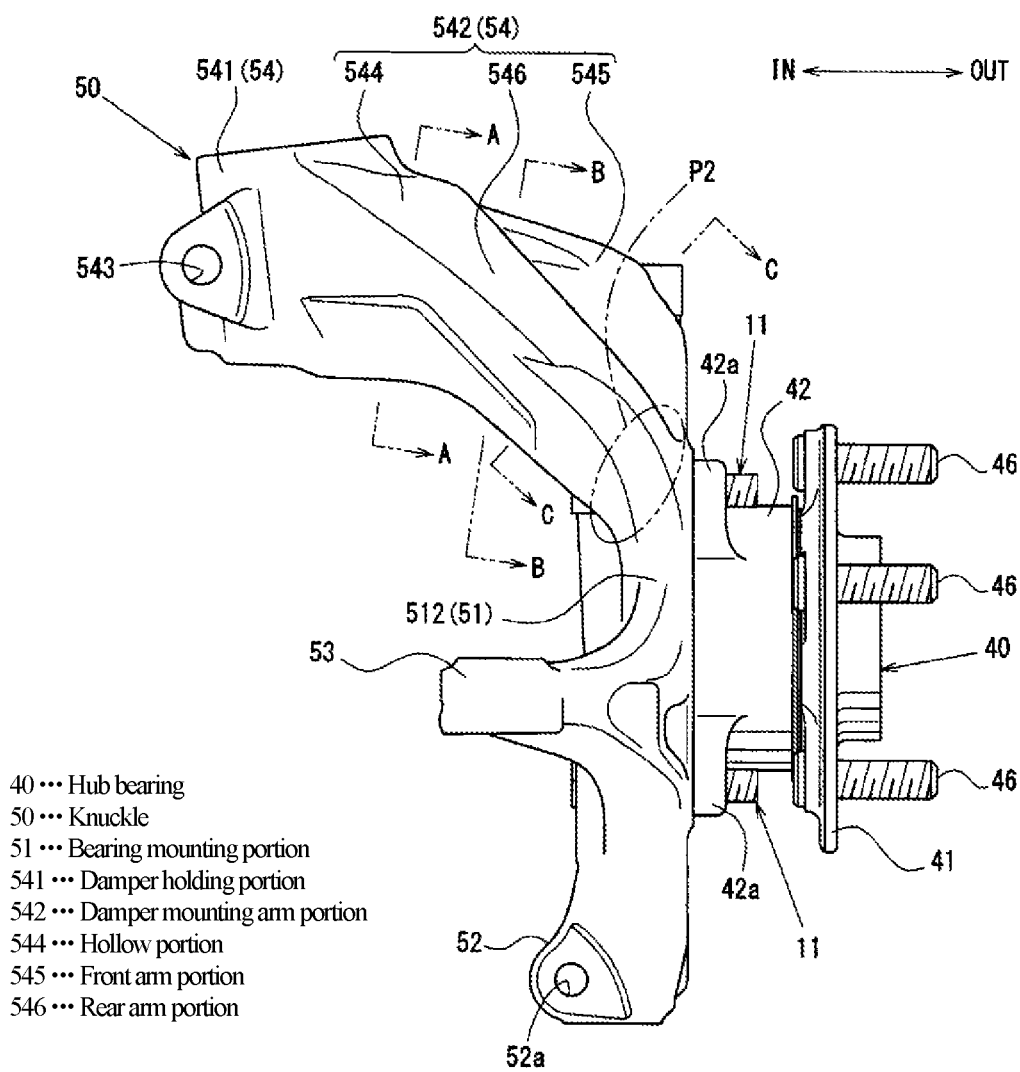
FIG. 5 is a rear view illustrating the external appearance of the knuckle on the right side in rear view.

Note that FIG. 1 is a front view of the suspension device 10 of an automobile, FIG. 2 is an external perspective view of a knuckle 50 on the right side as viewed from the vehicle front inside, FIG. 3 illustrates a vertical cross-sectional view along the vehicle width direction of the knuckle 50 on the right side, FIG. 4 is a front view of the knuckle 50 on the right side, and FIG. 5 is a rear view of the knuckle 50 on the right side.

Figure 6:
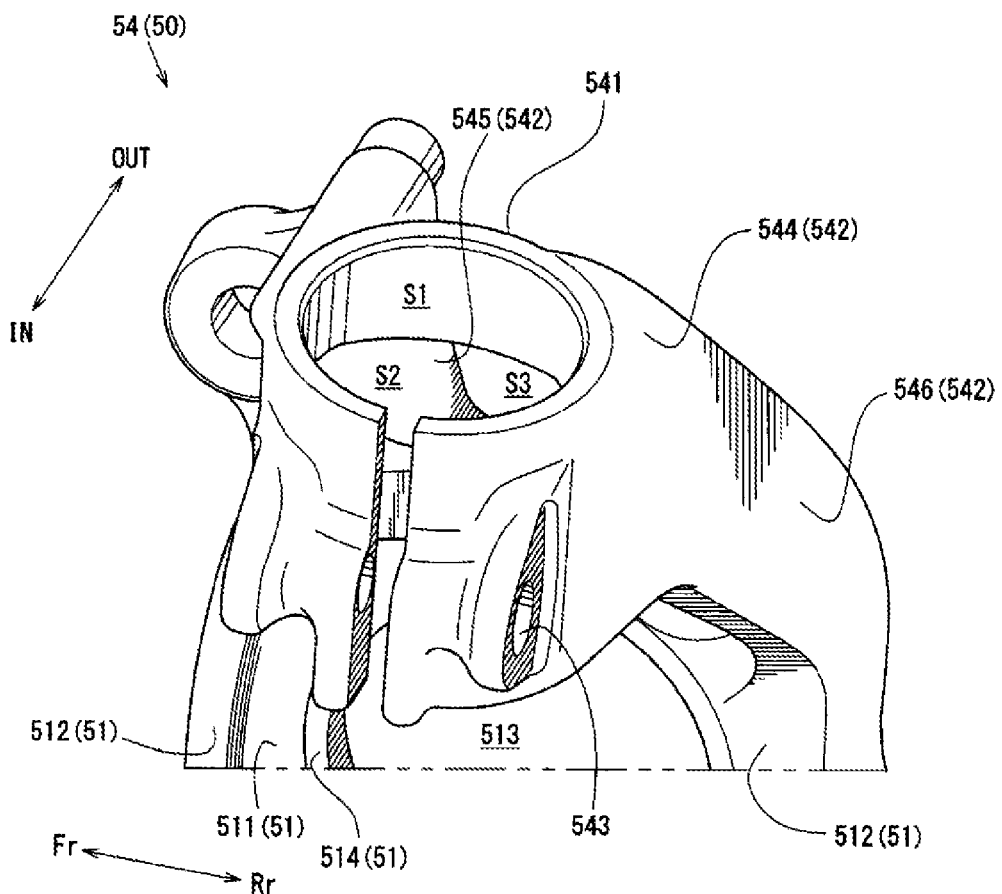
FIG. 6 is an external perspective view illustrating the external appearance of a damper holding portion on the right side as viewed from the vehicle rear inner side.
Figure 7:
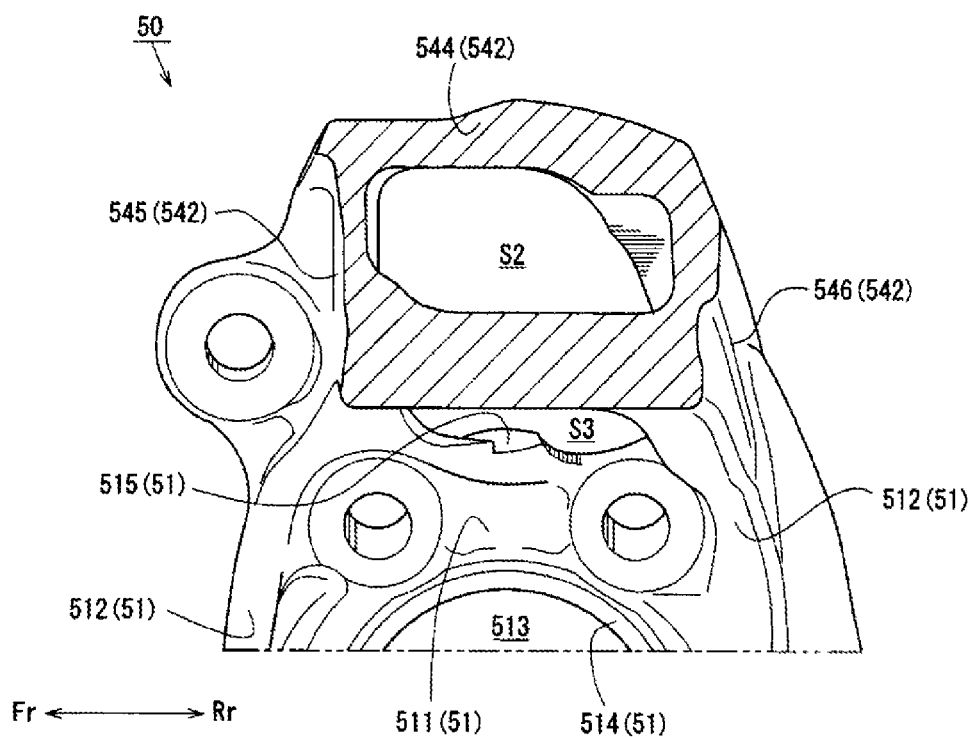
FIG. 7 is a cross-sectional view taken along arrows A-A in FIG. 4.
Figure 8:
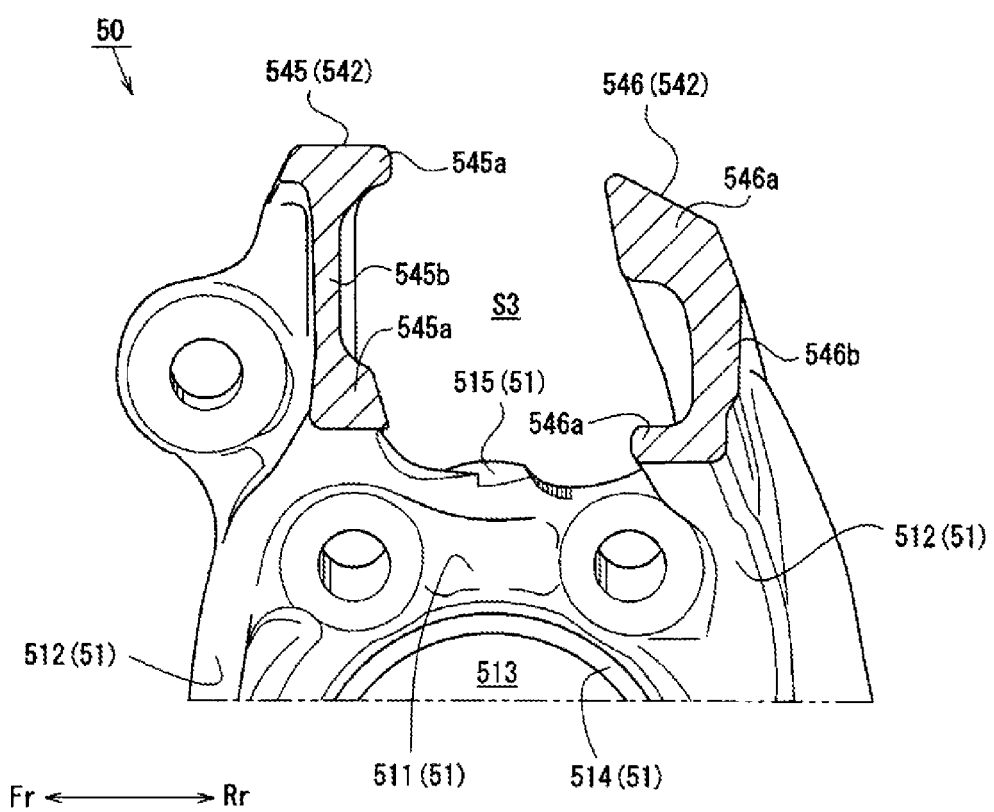
FIG. 8 is a cross-sectional view taken along arrows B-B in FIG. 4.
Figure 9:
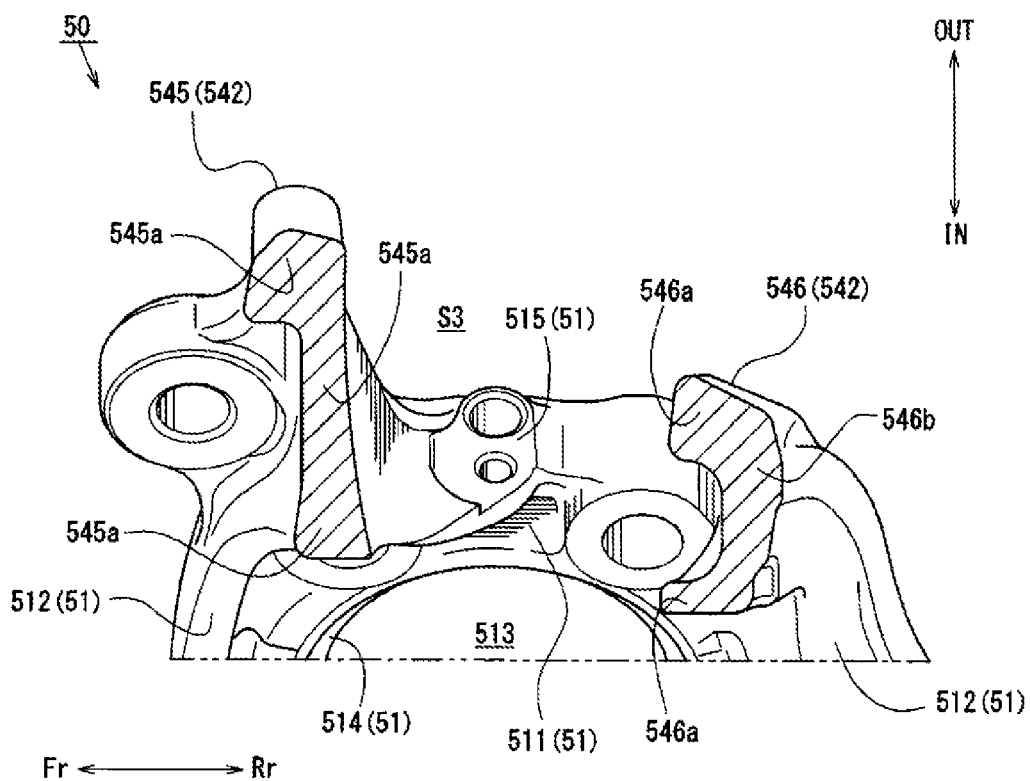
FIG. 9 is a cross-sectional view taken along arrows C-C in FIG. 4.

Further, FIG. 6 illustrates an external perspective view of a damper holding portion 541 on the right side as viewed from the vehicle rear inner side, FIG. 7 is a cross-sectional view taken along arrows A-A in FIG. 4, FIG. 8 is a cross-sectional view taken along arrows B-B in FIG. 4, and FIG. 9 is a cross-sectional view taken along arrows C-C in FIG. 4.

In addition, in FIG. 1, a front wheel 4 is indicated by a two-dot chain line, and illustration of a lower arm 30 and a tie rod 7a are omitted in FIGS. 2 and 3.

In addition, in the drawings, arrows Fr and Rr indicate the vehicle front-rear direction, arrow Fr indicates the vehicle front, and arrow Rr indicates the vehicle rear.

Further, arrows Rh and Lh and arrows IN and OUT indicate the vehicle width direction, arrow Rh indicates the vehicle rightward direction, arrow Lh indicates the vehicle leftward direction, arrow IN indicates the vehicle inner side, and arrow OUT indicates the vehicle outer side.

In addition, the upper side in FIG. 1 is defined as the vehicle upper side, the lower side in FIG. 1 is defined as the vehicle lower side, the left side in FIG. 2 is defined as the vehicle front side, and the right side in FIG. 2 is defined as the vehicle rear side.

As illustrated in FIG. 1, the automobile in the present embodiment is a vehicle in which front wheels 4 which are driving wheels are disposed at a vehicle front portion configured of front side frames 1 extending in the vehicle front-rear direction, suspension towers 2 disposed at the vehicle outer side and the vehicle upper side with respect to the front side frames 1, and a sub frame 3 disposed at the vehicle lower side with respect to the front side frames 1.

The suspension device 10 for supporting the front wheels 4 in such an automobile is a so-called strut-type suspension configured of a pair of right and left dampers 20 whose upper ends are coupled to the upper surfaces of the suspension towers 2, a pair of right and left lower arms 30 coupled to the sub frame 3, a pair of right and left hub bearings 40 to which the front wheels 4 are attached, and a pair of right and left knuckles 50 to which the damper 20 and the lower arm 30 are coupled and holds the hub bearing 40.

As illustrated in FIG. 1, the damper 20 is elastically supported at the upper end thereof by the suspension tower 2 through a rubber bushing, not illustrated, so as to be able to swing in the vehicle front-rear direction and the vehicle width direction, and the damper 20 is disposed such that the lower end thereof is positioned on the vehicle outer side with respect to the upper end.

The damper 20 is coupled to the other damper 20 through: a stabilizer link 5 whose upper end is coupled to a damper main body 21 that accommodates a piston rod coupled to the suspension tower 2 so as to be able to project and retract in the vehicle vertical direction; and a stabilizer 6 which is coupled to the lower end of the stabilizer link 5and is disposed on the upper surface of the sub frame 3 and extends in the vehicle width direction.

In addition, as illustrated in FIG. 1, the vehicle inner side of the lower arm 30 is coupled to the sub frame 3 through a rubber bushing (not illustrated) so as to be swingable in the vertical vehicle direction, and the vehicle outer side of the lower arm 30 is coupled to a lower portion of the knuckle 50 through a shaft portion of a ball joint provided on the vehicle outer side, the shaft portion extending in the vehicle vertical direction.

Note that that the rubber bushing which elastically supports the vehicle inner side of the lower arm 30 is configured such that the elastic modulus thereof in the vehicle width direction is higher than the elastic modulus in the vehicle width direction of the rubber bushing which elastically supports the upper end of the damper 20.

In addition, as illustrated in FIGS. 2 and 3, the hub bearing 40 is a hub bearing having a hub 41 to which the front wheel 4 is attached, and configured to be able to rotate the hub 41 and an outer ring 42 relative to each other with the vehicle width direction as a rotation axis. The hub bearing 40 is fastened and fixed to a side surface on the vehicle outer side of the knuckle 50 by four fastening bolts 11 screwed to an outer ring flange 42a extending from the outer ring 42.

More specifically, as illustrated in FIG. 3, the hub bearing 40 includes the substantially cylindrical outer ring 42 extending in the vehicle width direction, an inner ring 43 having an outer peripheral surface facing the inner peripheral surface on the vehicle inner side of the outer ring 42, the hub 41 in which a front end of a shaft portion 41a extending toward the vehicle inner side is press-fitted into the inner ring 43, a plurality of bearing balls 44 interposed between the inner ring 43 and the outer ring 42 on the vehicle inner side, and a plurality of bearing balls 45 interposed between the shaft portion 41a of the hub 41 and the outer ring 42 on the vehicle outer side.

Note that in the hub 41, a stud bolt 46 is provided to which a wheel nut (not illustrated) to which the front wheel 4 is fixed is screwed, and an insertion hole 47 through which a front-end shaft portion of a drive shaft is inserted is formed to be opened along the vehicle width direction.

In addition, as illustrated in FIGS. 1 and 2, the knuckle 50 in integrally formed of a bearing mounting portion 51 on which the hub bearing 40 is mounted, a lower arm mounting portion 52 on which the lower arm 30 is mounted, a tie-rod mounting portion 53 on which both ends of a steering device 7 disposed on the upper surface of the sub frame 3 are mounted, and a damper mounting portion 54 on which the lower end of the damper 20 is mounted.

As illustrated in FIGS. 2 to 5, the bearing mounting portion 51 is integrally formed of a mounting main body portion 511 having a thickness in the vehicle width direction enough to ensure rigidity capable of holding the hub bearing 40 and having a substantially elliptical shape long in the vehicle vertical direction in side view and has a substantially oblong shape in a side view, and a side wall portion 512 erected from the outer peripheral edge of the mounting main body portion 511 toward the vehicle inner side.

As illustrated in FIGS. 2 and 3, at the substantially center in side view of the mounting main body portion 511, an opening 513 is formed to be opened so as to be coaxial with the insertion hole 47 of the hub bearing 40, the opening 513 having a diameter greater than that of the insertion hole 47 and communicating with the insertion hole 47.

Further, in the mounting main body portion 511, an opening edge wall portion 514 erected toward the vehicle inner side is formed along the opening edge of the opening 513.

Four bolt insertion holes (not illustrated) through each of which the fastening bolt 11 is inserted are formed in the circumference of the opening edge wall portion 514 of the mounting main body portion 511 along the vehicle width direction.

Note that a sensor mounting portion 515 to which an ABS sensor (not illustrated) is attached is integrally formed on the upper portion of the bearing mounting portion 51 between a front arm portion 545 and a rear arm portion 546 of the damper mounting portion 54 to be described later. The sensor mounting portion 515 is integrally formed with the side wall portion 512 so as to protrude toward the vehicle inner side.

As illustrated in FIGS. 2 to 5, on the vehicle lower side of the rotation axis of the hub bearing 40, the lower arm mounting portion 52 has a slit-shaped opening provided on the vehicle inner side and extending in the vehicle vertical direction and the lower arm mounting portion 52 is formed in a C-shaped clamp shape capable of holding the shaft portion of the ball joint provided on the lower arm 30.

Further, in the lower arm mounting portion 52, a bolt insertion hole 52a through which a fastening bolt (not illustrated) for holding the shaft portion of the ball joint is inserted is formed to be opened along the vehicle front-rear direction.

As illustrated in FIGS. 2 to 5, the tie-rod mounting portion 53 extends from the rear portion of the bearing mounting portion 51 toward the vehicle inner side and the vehicle rear side on the vehicle lower side with respect to the rotation axis of the hub bearing 40. An attachment hole (not illustrated) into which the front end of the tie rod 7a, which is an end portion of the steering device 7, is attached is formed to be opened in the vehicle vertical direction in the front end of the tie-rod mounting portion 53.

As illustrated in FIGS. 2 to 5, the damper mounting portion 54 is integrally formed of a damper holding portion 541 which holds the lower end of the damper 20 so as not to swing at the vehicle upper side and the vehicle inner side with respect to the bearing mounting portion 51, and a damper mounting arm portion 542 coupling the damper holding portion 541 and the bearing mounting portion 51.

As illustrated in FIGS. 2, 3, and 6, the damper holding portion 541 is formed in a C-shaped clamp shape having a slit-like opening in the vehicle vertical direction by extending substantially in the vehicle vertical direction a substantially C-shaped cross-sectional shape with the vehicle inner side opened at an interval through which a flange member 22 provided at the lower end of the damper 20 can be inserted.

[Further, in the damper holding portion 541, a bolt insertion hole 543 through which a fastening bolt 12 for holding the flange member 22 is inserted is formed to be opened along the vehicle front-rear direction so as to communicate with an opening of the flange member 22.

In addition, as illustrated in FIGS. 3 and 6, in the damper holding portion 541, an opening for communicating a cylindrical opening S1, which is the inner space of the damper holding portion 541, with the outside is formed toward the vehicle outer side.

As illustrated in FIGS. 3 to 5, the damper mounting arm portion 542 is configured of a hollow portion 544 extending from the outer peripheral surface of the damper holding portion 541, the front arm portion 545 coupling the hollow portion 544 and a front portion of the bearing mounting portion 51, and the rear arm portion 546 coupling the hollow portion 544 and a rear portion of the bearing mounting portion 51.

As illustrated in FIGS. 3 and 7, the hollow portion 544 is formed into an internal hollow shape continuous with the opening of the damper holding portion 541 by extending the closed cross section having a substantially rectangular cross-sectional shape along the vehicle front-rear direction by a predetermined length from the outer peripheral surface of the damper holding portion 541 toward the vehicle inner side. Note that an integral opening configured of the opening of the damper holding portion 541 and the opening of the hollow portion 544 is defined as a hollow opening S2.

As illustrated in FIGS. 8 and 9, the front arm portion 545 and the rear arm portion 546 are formed such that the front arm portion 545 and the rear arm portion 546 form an open cross section in contrast to the hollow portion 544 having a closed cross section.

As illustrated in FIGS. 2 and 4, the front arm portion 545 extends from the upper end of the bearing mounting portion 51 between the side wall portion 512 and the sensor mounting portion 515 on the vehicle front side of the bearing mounting portion 51 toward the vehicle inner side so as to be substantially orthogonal to the bearing mounting portion 51.

The front arm portion 545 is formed such that, in front view, the thickness in the vehicle vertical direction is thicker than the thickness in the vehicle width direction of the bearing mounting portion 51 and becomes gradually thinner from the hollow portion 544 toward the bearing mounting portion 51.

Further, the front arm portion 545 is formed such that rigidity in terms of the second moment of area about the axis in the vehicle front-rear direction on the bearing mounting portion 51 side is 2.5 times or more than that on the hollow portion 544 side, and more preferably 3.0 times or more.

More specifically, as illustrated in FIG. 8, the cross section of the front arm portion 545 along the vehicle front-rear direction at a substantially intermediate position in front view is formed into a substantially I-shaped cross section formed of a pair of flange portions 545a each of which has a substantially rectangular cross section long in the vehicle front-rear direction and which are disposed with a predetermined interval in the vehicle vertical direction, and a flat plate portion 545b having a substantially rectangular cross section long in the vehicle vertical direction and interposed between the pair of flange portions 545a.

Further, as illustrated in FIGS. 7 to 9, the front arm portion 545 is formed such that the length in the vehicle front-rear direction of the flange portion 545a in the cross section along the vehicle front-rear direction is continuously shorter from the hollow portion 544 toward the bearing mounting portion 51.

As described, the front arm portion 545 is formed such that the thickness in the vehicle vertical direction is gradually thinner from the hollow portion 544 toward the bearing mounting portion 51 and the thickness in the vehicle vertical direction thereof is thicker than the thickness in the vehicle width direction of the bearing mounting portion 51.

Therefore, in the vicinity of the bearing mounting portion 51 in the front arm portion 545 forms a low-rigidity portion P1 (see FIG. 4) whose cross-sectional area is smaller than the cross-sectional area of the peripheral portion, in other words, the rigidity thereof is lower than the rigidity of the peripheral portion.

The low-rigidity portion P1 is formed to have a cross-sectional area and a shape such that the low-rigidity portion P1 can be warped and deformed by a load in the rotation direction acting on the knuckle 50 when repeated loads are applied to the front wheel 4 as vibration in the 160 Hz band, for example.

In contrast, as illustrated in FIGS. 3 and 5, the rear arm portion 546 extends from the side wall portion 512 at the upper end of the bearing mounting portion 51 and on the vehicle rear side at a location substantially identical to the upper end position of the hub bearing 40 in the vehicle vertical direction gently toward the vehicle inner side and the vehicle upper front side.

In rear view, the rear arm portion 546 is formed so as to be gradually thinner from the hollow portion 544 to the bearing mounting portion 51 and is formed so as to smoothly continue to the tie-rod mounting portion 53 through the side wall portion 512.

Further, the rear arm portion 546 is formed such that rigidity in terms of the second moment of area about the axis in the vehicle front-rear direction on the bearing mounting portion 51 side is 2.5 times or more than that on the hollow portion 544 side, and more preferably 3.0 times or more.

More specifically, as illustrated in FIG. 8, the cross section of the rear arm portion 546 along the vehicle front-rear direction at a substantially intermediate position in front view is formed into a substantially gate shaped cross-section with the vehicle front side opened, formed of a pair of flange portions 546a each of which has a substantially rectangular cross section long in the vehicle front-rear direction and which are disposed with a predetermined interval in the vehicle vertical direction, and a flat plate portion 546b having a substantially rectangular cross section long in the vehicle width direction and interposed between the pair of flange portions 546a.

As described above, since the rear arm portion 546 is formed to be gradually thinner in rear view from the damper holding portion 541 to the bearing mounting portion 51, the vicinity of the boundary between the rear arm portion 546 and the bearing mounting portion 51 forms a low-rigidity portion P2 (see FIG. 5) whose cross-sectional area is smaller than the cross-sectional area of the peripheral section, in other words, the rigidity thereof is lower than the rigidity of the peripheral portion.

The low-rigidity portion P2 is formed to have a cross-sectional area and a shape such that the low-rigidity portion P2 can be warped and deformed by a load in the rotation direction acting on the knuckle 50 when repeated loads are applied to the front wheel 4 as vibration in the 160 Hz band, for example.

The damper mounting portion 54 having the above-described configuration constitutes an arm-portion opening S3 opened in the vehicle vertical direction and the vehicle width direction together with the bearing mounting portion 51.

More specifically, as illustrated in FIG. 3, in front view, the arm-portion opening S3 is formed into an opening shape obtained by removing, in the vehicle vertical direction and the vehicle width direction, the range on the vehicle upper side with respect to the upper end of the bearing mounting portion 51, the range extending from the side surface on the vehicle outer side of the bearing mounting portion 51 to the hollow portion 544 in the vehicle width direction.

Therefore, the arm-portion opening S3 is configured such that a virtual surface area along the upper edge of the front arm portion 545 and the upper edge of the rear arm portion 546 from the side surface on the vehicle outer side of the bearing mounting portion 51 to the upper surface of the hollow portion 544 is larger than the opening area of the hollow portion 544.

Figure 10:
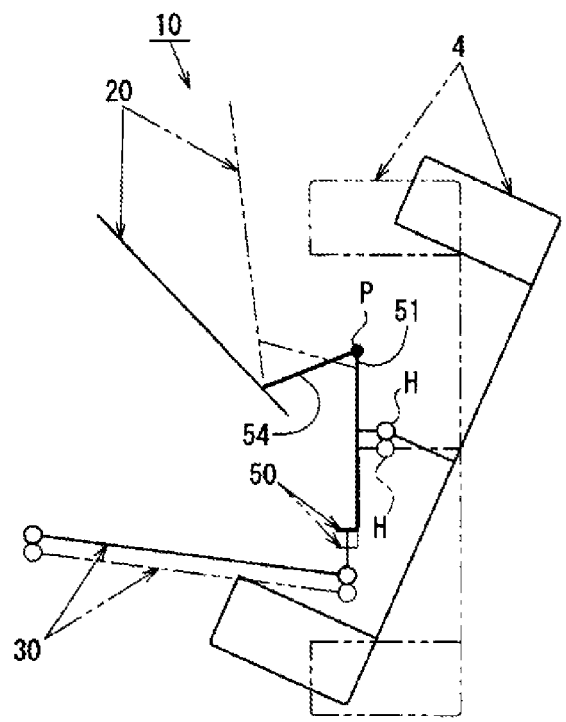
FIG. 10 is an explanatory diagram for explaining movement of a knuckle on the left side during traveling.

Next, movement of the knuckle 50 when repeated loads in the vehicle vertical direction of is applied to the front wheel 4 due to unevenness of a road surface or the like in the suspension device 10 including the knuckle 50 having the above-described low-rigidity portions P1, P2 will be explained with reference to FIG. 10 illustrating an explanatory diagram for explaining movement of the knuckle 50 on the left side during travelling.

Note that in FIG. 10, in order to clarify illustration, the front wheels 4, the damper 20, the lower arm 30, and the knuckle 50 are illustrated as a diagrammatic model, and the knuckle 50 is illustrated in bold lines.

Further, in FIG. 10, the low-rigidity portions P1, P2 are illustrated as a low-rigidity portion P. In addition, the two-dot chain lines in FIG. 10 illustrate the front wheels 4, the damper 20, the lower arm 30, and the knuckle 50 in a stationary state.

When repeated loads in the vehicle vertical direction is applied to the front wheel 4 in the above-described suspension device 10 of the stmt-type suspension, it is known that a load acts on the front wheel 4 and the knuckle 50 in a rotation direction such that the knuckle 50 and the front wheel 4 are rotated relative to each other in reverse directions with the hub bearing 40 as the rotation center H.

Then, in the suspension device 10 including the knuckle 50 of the present embodiment, when a load in the rotation direction due to repeated loads in the vehicle vertical direction applied to the front wheel 4 acts on the knuckle 50, the knuckle 50 is started to be warped and deformed so that the damper mounting portion 54 bends in the vehicle vertical direction with respect to the bearing mounting portion 51 with the low-rigidity portion P as the center as illustrated in FIG. 10.

Therefore, since swinging of the bearing mounting portion 51 in the rotation direction about the rotation center H is suppressed, a load component in the vehicle width direction of the load in the rotation direction acting on the knuckle 50 becomes difficult to act on the lower arm 30. In contrast, transmission to the vehicle body of a load component in the vehicle vertical direction acting on the lower arm 30 is blocked or absorbed due to extension and contraction of the damper 20 in the vehicle vertical direction and swinging of the lower arm 30.

That is, due to warping deformation of the knuckle 50 with the low-rigidity portion P as the center, the load component in the vehicle width direction of the load in the rotation direction acting on the knuckle 50 is converted into a load in the vehicle vertical direction acting on the bearing mounting portion 51, and transmission to the vehicle body of the load component in the vehicle vertical direction is blocked or absorbed due to extension and contraction of the damper 20 in the vehicle vertical direction and swinging of the lower arm 30.

At this time, transmission to the vehicle body of the load component in the vehicle width direction acting on the damper 20 through the damper mounting portion 54 is blocked or absorbed by the damper 20 swinging in the vehicle width direction due to elastic force of the rubber bushing.

As described above, in the suspension device 10 including the knuckle 50 according to the present embodiment, transmission to the vehicle body of repeated loads in the vehicle vertical direction applied to the front wheel 4 is blocked or absorbed due to warping deformation of the knuckle 50 with the low-rigidity portion P as the center, extension and contraction, and swinging in the vehicle width direction of the damper 20 and swinging of the lower arm 30. Thus, transmission of the repeated loads to the vehicle body as vibration is suppressed.

Subsequently, the method for manufacturing the above-described knuckle 50 will be described in detail with reference to FIGS. 11 and 12.

Figure 12:
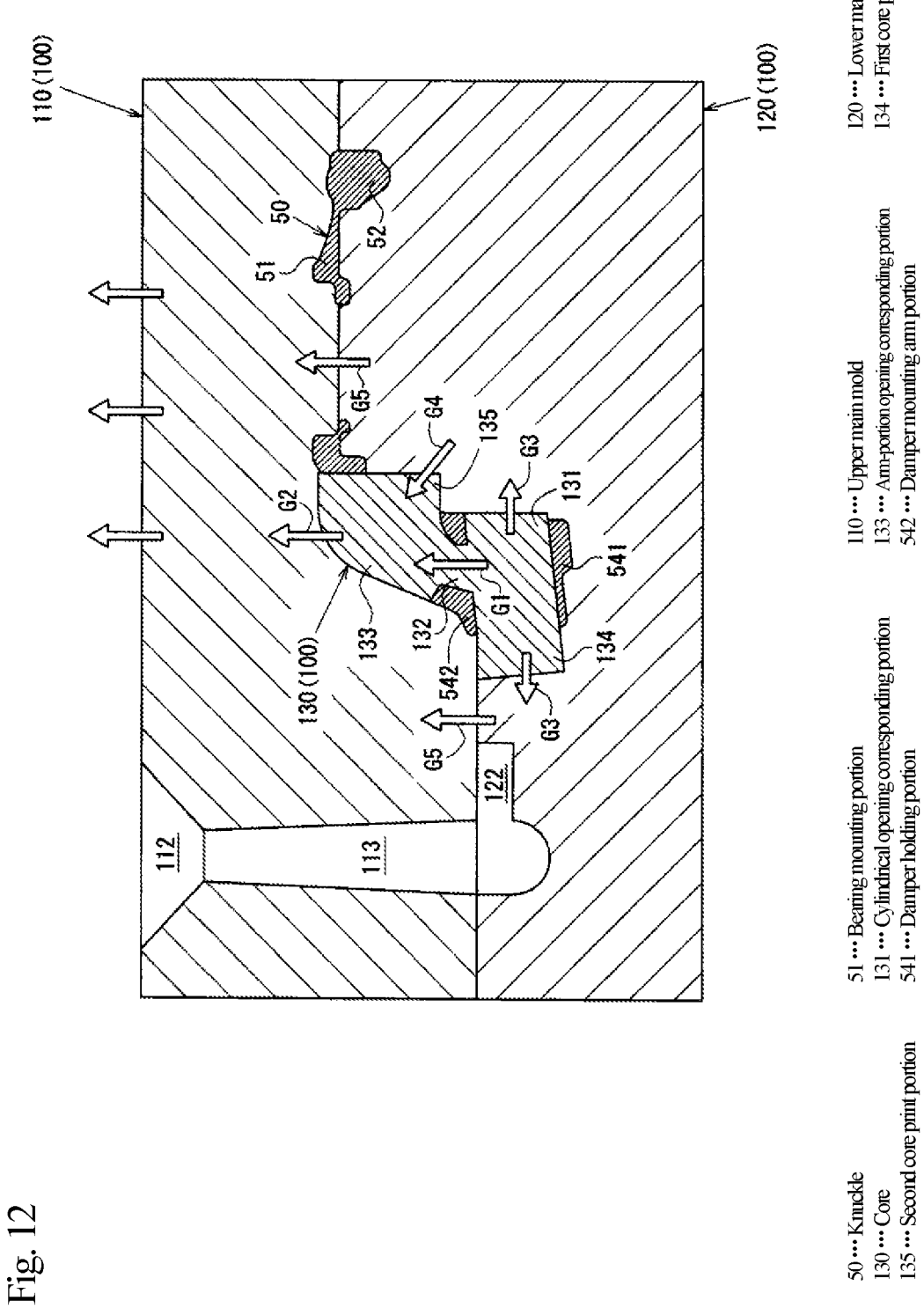
FIG. 12 is an explanatory view for explaining a flow of gas in a casting process.

Note that FIG. 11 illustrates a cross-sectional view of components of a mold 100, and FIG. 12 is an explanatory view for explaining a flow of gas in a casting process.

As illustrated in FIG. 11, the method for manufacturing the knuckle 50 according to the present embodiment is a method for casting the knuckle 50 in a state of being turned sideways with the damper holding portion 541 located at a lower side and the bearing mounting portion 51 located at an upper side by using the mold 100 including an upper main mold 110 located on the upper side, a lower main mold 120 on which the upper main mold 110 is placed, and one core 130 interposed between the lower main mold 120 and the upper main mold 110.

First, the mold 100 used in the present embodiment will be described.

As illustrated in FIGS. 11 and 12, the upper main mold 110 is provided with: a recessed portion 111 recessed in a shape corresponding to the upper portion of the bearing mounting portion 51 and the upper portion of the damper mounting arm portion 542 of the knuckle 50 in the state of being turned sideways; a sprue 112 into which molten metal is poured; and a runner 113 extending downward from the sprue 112.

In contrast, as illustrated in FIGS. 11 and 12, the lower main mold 120 is provided with: a recessed portion 121 recessed in a shape corresponding to the lower portion of the bearing mounting portion 51, the lower portion of the damper mounting arm portion 542, and the damper holding portion 541 of the knuckle 50 in the state of being turned sideways; and a runner 122 extending in a direction substantially orthogonal to the runner 113 of the upper main mold 110 and continues to the recessed portion 121.

Further, as illustrated in FIGS. 11 and 12, a first core print fitting portion 123 is recessed in the lower main mold 120 on the vehicle upper side of the damper holding portion 541. The first core print fitting portion 123 is continuous with the recessed portion 121 corresponding to the damper holding portion 541, and a first core print portion 134 of the core 130 to be described later is fitted to the first core print fitting portion 123.

In addition, as illustrated in FIGS. 11 and 12, a second core print fitting portion 124 is recessed in the lower main mold 120 on the vehicle lower side between the front arm portion 545 and the rear arm portion 546. The second core print fitting portion 124 is continuous with the recessed portion 121 corresponding to the front arm portion 545 and the rear arm portion 546, and a second core print portion 135 of the core 130 to be described later is fitted to the second core print fitting portion 124.

The core 130 is formed by hardening sand into a desired shape by using resin. As illustrated in FIGS. 11 and 12, the core 130 is integrally formed of a cylindrical opening corresponding portion 131 having a shape corresponding to the cylindrical opening S1 of the damper holding portion 541, a hollow opening corresponding portion 132 having a shape corresponding to the hollow opening S2 of the damper mounting arm portion 542, and an arm-portion opening corresponding portion 133 having a shape corresponding to the arm-portion opening S3 of the damper mounting arm portion 542.

Note that in order to prevent positional displacement of the core 130 due to thermal expansion, the arm-portion opening corresponding portion 133 is formed in a shape capable of ensuring a gap of about 0.5 mm, for example, between the upper surface of the arm-portion opening corresponding portion 133 and the upper main mold 110.

Further, as illustrated in FIGS. 11 and 12, the core 130 is integrally formed of the first core print portion 134 fitted to the first core print fitting portion 123 of the lower main mold 120, and the second core print portion 135 fitted to the second core print fitting portion 124 of the lower main mold 120.

The first core print portion 134 is formed in a shape extending from the cylindrical opening corresponding portion 131 toward the vehicle upper side of the knuckle 50. Note that the first core print portion 134 is supported so as to be sandwiched between the lower surface of the upper main mold 110 and the first core print fitting portion 123 of the lower main mold 120, between the upper main mold 110 and the lower main mold 120.

The second core print portion 135 is formed in a shape extending from the arm-portion opening corresponding portion 133 toward the vehicle lower side of the knuckle 50.

Next, casting using the mold 100 having the above-described configuration will be briefly described.

When the core 130 is placed in the mold 100 and molten metal is poured into the sprue 112 of the mold 100, the molten metal passes through the runner 113 of the upper main mold 110 and the runner 122 of the lower main mold 120, and is supplied to the inner space corresponding to the damper holding portion 541. When the inner space of the mold 100 is filled with the molten metal and the molten metal is solidified, the integral knuckle 50 is manufactured by casting. In addition, in the inner space of the mold 100, the molten metal is solidified while the molten metal is removed from the portions corresponding to the cylindrical opening S1, the hollow opening S2, and the arm-portion opening S3 to be described later by using the core 130. Thus, the knuckle 50 having the cylindrical opening S1, the hollow opening S2, and the arm-portion opening S3 formed therein is casted.

When the inner space corresponding to the shape of the knuckle 50 in the state of being turned sideways is filled with the molten metal without a gap, the core 130 is heated by the molten metal to generate gas and the shape of the core 130 collapses as time passes.

Here, a flow of the gas generated in the core 130 heated by the molten metal will be described with reference to FIG. 12.

First, as indicated by arrow G1 in FIG. 12, gas generated in the cylindrical opening corresponding portion 131 of the core 130 flows through the hollow opening corresponding portion 132, and flows to the arm-portion opening corresponding portion 133 together with gas generated in the hollow opening corresponding portion 132.

Then, as indicated by arrow G2 in FIG. 12, the gas having flowed to the arm-portion opening corresponding portion 133 flows toward the upper main mold 110 together with gas generated in the arm-portion opening corresponding portion 133, and is discharged to the outside.

Note that the gas generated in the cylindrical opening corresponding portion 131 can flow from the opening in the axial direction of the damper holding portion 541 toward the lower main mold 120 as indicated by arrow G3 in FIG. 12. The gas having flowed from the cylindrical opening corresponding portion 131 to the lower main mold 120 flows through the arm-portion opening corresponding portion 133 to the upper main mold 110 as indicated by arrow G4 in FIG. 12, or flows from the lower main mold 120 directly to the upper main mold 110 as indicated by arrow G5 in FIG. 12 to be discharged to the outside.

As described above, in the method for manufacturing the knuckle 50 in the present embodiment, since not the entirety of the core 130 is surrounded by the molten metal in the casting process, the gas generated in the core 130 can be reliably discharged to the outside through the upper main mold 110.

After a predetermined time has passed, the mold 100 is disassembled and the formed knuckle 50 is taken out. Since the collapsed core 130 adheres to the knuckle 50, the attached core 130 is removed by shot blasting from multiple directions. Note that at this time, the surface of the knuckle 50 may be polished by continuously performing shot blasting on the surface of the knuckle 50 from which the core 130 has been removed.

As described above, the method for manufacturing the knuckle 50 according to the present embodiment for casting the knuckle 50 can ensure favorable castability with which the knuckle 50 capable of suppressing transmission of vibration from the front wheel 4 to the vehicle body is casted and, at the same time, production efficiency is improved.

Specifically, when the knuckle 50 in the state of being turned sideways is casted by using the upper main mold 110, the lower main mold 120, and the core 130, gas generated in the cylindrical opening S1 of the damper holding portion 541 can flow from both ends of the damper holding portion 541 in the axial direction to the lower main mold 120 or can flow to the hollow opening S2.

The gas having flowed from the cylindrical opening S1 to the lower main mold 120 can flow to the arm-portion opening S3 surrounded by the front arm portion 545 and the rear arm portion 546 together with gas generated in the lower main mold 120.

In contrast, the gas having flowed from the cylindrical opening S1 to the hollow opening S2 can flow to the arm-portion opening S3 together with gas generated in the hollow opening S2.

Then, the gas having flowed from the lower main mold 120 to the arm-portion opening S3 and the gas having flowed from the hollow opening S2 to the arm-portion opening S3 can flow to the upper main mold 110 together with gas generated in the arm-portion opening S3.

At this time, since the opening area of the arm-portion opening S3 is larger than the opening area of the hollow opening S2, the gas having flowed in from the lower main mold 120 and the hollow opening S2, and the gas generated in the arm-portion opening S3 can flow to the upper main mold 110 without staying in the arm-portion opening S3.

As a result, since the method for manufacturing the knuckle 50 enables gas generated in the mold 100 to be efficiently discharged to the outside, it is possible to prevent occurrence of a casting defect due to the generated gas.

In addition, since the front arm portion 545 and the rear arm portion 546 are separated in the vehicle front-rear direction, in the method for manufacturing the knuckle 50, for example, a shot blasting nozzle used for removing the core 130 attached to the knuckle 50 can be easily disposed toward the facing surfaces of the front arm portion 545 and the rear arm portion 546 and the hollow opening S2.

Therefore, for example, as compared with a case where the core is removed from the damper mounting arm portion having the closed cross section and coupling the bearing mounting portion 51 and the damper holding portion 541 through the opening formed by the core print after casting, in the method for manufacturing the knuckle 50, it is possible to easily remove the core 130 attached to the facing surfaces of the front arm portion 545 and the rear arm portion 546, the hollow opening S2, and the like by shot blasting or the like.

Therefore, according to the method for manufacturing the knuckle 50, removal of the core 130 attached to the knuckle 50 and polishing of a casting surface by shot blasting can be continuously performed, for example, in the case of removing the core from the damper mounting arm portion having the closed cross section. Therefore, it is possible to shorten the time required for manufacturing the knuckle 50.

In other words, since the method for manufacturing the knuckle 50 can achieve both satisfactory gas releasability and improvement of removal work efficiency of the core 130, production efficiency can be improved.

Furthermore, since the damper holding portion 541 and the bearing mounting portion 51 are coupled by the hollow portion 544 having the closed cross section and the front arm portion 545 and the rear arm portion 546 extending from the hollow portion 544, in the knuckle 50, rigidity of a bearing mounting portion 51 side of the damper mounting arm portion 542 can be made lower than that of a damper holding portion 541 side of the damper mounting arm portion 542.

Therefore, when a load in the rotation direction acts on the knuckle 50, the knuckle 50 can be warped and deformed such that the damper holding portion 541 and the damper mounting arm portion 542 are bent with respect to the bearing mounting portion 51, at a vehicle upper side with respect to the upper end of the hub bearing 40.

As described, according the method for manufacturing the knuckle 50, it is possible to cast the knuckle 50 capable of suppressing transmission of vibration from the front wheel 4 to the vehicle body even if production efficiency is improved.

Therefore, according to the method for manufacturing the knuckle 50, it is possible to ensure favorable castability with which the knuckle 50 capable of suppressing transmission of vibration from the front wheel 4 to the vehicle body is casted and, at the same time, production efficiency is improved.

Further, the arm-portion opening S3 in which the range extending from the side surface on the vehicle outer side of the bearing mounting portion 51 to the hollow portion 544 is opened in the vehicle vertical direction side and the vehicle width direction side is casted by using the one core 130 supported by the upper main mold 110 and the lower main mold 120. Therefore, according to the method for manufacturing the knuckle 50, the knuckle 50 can be casted which has the opening area of the arm-portion opening S3 larger than that in the case of, for example, opening a range from the side surface on the vehicle inner side of the bearing mounting portion 51 to the hollow portion 544.

Thus, in the method for manufacturing the knuckle 50, gas generated in the mold 100 can be more reliably released to the outside through the arm-portion opening S3 with a larger opening area, and also removal work efficiency of the core 130 attached to the knuckle 50 can be further improved.

In addition, since the arm-portion opening S3 is formed in the range from the side surface on the vehicle outer side of the bearing mounting portion 51 to the hollow portion 544, the front arm portion 545 and the rear arm portion 546 are formed to be continuous with the upper surface of the bearing mounting portion 51.

In the case of such a shape, the vicinity of the boundary between the front arm portion 545 and the bearing mounting portion 51 and the vicinity of the boundary between the rear arm portion 546 and the bearing mounting portion 51 are likely to become rigidity changing points. Therefore, in the knuckle 50, the rigidity of the bearing mounting portion 51 side of the damper mounting arm portion 542 can be made further lower.

That is, since the damper holding portion 541 and the damper mounting arm portion 542 can be warped and deformed integrally at a location closer to the hub bearing 40, the knuckle 50 can further suppress swinging of the bearing mounting portion 51 in the vehicle width direction.

As described, according the method for manufacturing the knuckle 50, it is possible to cast the knuckle 50 capable of suppressing transmission of vibration from the front wheel 4 to the vehicle body even if production efficiency is improved.

Therefore, according to the method for manufacturing the knuckle 50, due to the arm-portion opening S3 having the larger opening area, it is possible to ensure favorable castability with which the knuckle 50 capable of suppressing transmission of vibration from the front wheel 4 to the vehicle body is casted and, at the same time, production efficiency is improved.

In addition, the core 130 includes the first core print portion 134 extending from the cylindrical opening corresponding portion 131 and the second core print portion 135 extending from the arm-portion opening corresponding portion 133, and the knuckle 50 having the cylindrical opening S1, the hollow opening S2, and the arm-portion opening S3 is integrally casted by using the one core 130 in which the first core print portion 134 and the second core print portion 135 are supported in the upper main mold 110 and the lower main mold 120. Therefore, the method for manufacturing the knuckle 50 can further improve castability of the knuckle 50.

Specifically, since the second core print portion 135 is offset in the vertical direction and the horizontal direction with respect to the first core print portion 134, the upper main mold 110 and the lower main mold 120 can reliably support the core 130 at two locations separated from each other in the vertical direction and the horizontal direction.

Thus, according to the method for manufacturing the knuckle 50, positioning of the core 130 with respect to the upper main mold 110 and the lower main mold 120 and support rigidity of the core 130 can be ensured at the same time. Therefore, according to the method for manufacturing the knuckle 50, it is possible to prevent the core 130 from being displaced in the casting process, and it is possible to cast the knuckle 50 with higher accuracy.

Further, the first core print portion 134 and the second core print portion 135 extend from the cylindrical opening corresponding portion 131 and the arm-portion opening corresponding portion 133, respectively. Therefore, in the method for manufacturing the knuckle 50, the first core print portion 134 and the second core print portion 135 do not affect the shape of the knuckle 50.

Therefore, according to the method for manufacturing the knuckle 50, a designer can freely design the shapes and the sizes of the first core print portion 134 and the second core print portion 135 without hindering mechanical strength and vibration transmission sensitivity of the knuckle 50. In other words, according to the method for manufacturing the knuckle 50, design flexibility of the knuckle 50 and design flexibility of the core 130 can be ensured at the same time.

Therefore, according to the method for manufacturing the knuckle 50, due to the first core print portion 134 extending from the cylindrical opening corresponding portion 131 of the core 130 and the second core print portion 135 extending from the arm-portion opening corresponding portion 133 of the core 130, castability of the knuckle 50 can be further improved.

Further, the front arm portion 545 and the rear arm portion 546 are configured of the pairs of flange portions 545a and 546a, each of the pairs having flange portions separated from each other with a predetermined interval in the vehicle vertical direction side, and the thin flat plate portions 545b and 546b interposed between the pair of flange portions 545a and 546a, respectively. Therefore, the method for manufacturing the knuckle 50 can ensure favorable castability with which the knuckle 50 having a high degree of design flexibility is casted and, at the same time, molten metal flowability in the damper mounting arm portion 542 is improved.

More specifically, in order to suppress a significant reduction in rigidity of the damper mounting arm portion 542 due to the arm-portion opening S3, in the knuckle 50, the thickness of the front arm portion 545 and the rear arm portion 546 on the vehicle front-rear direction side is likely to be thicker than the thickness of the damper mounting arm portion having the closed cross section.

Therefore, according the method for manufacturing the knuckle 50, it is possible to ensure that the sprue runner having a sufficient size is provided between the one core 130 and the upper main mold 110 and the lower main mold 120 corresponding to the front arm portion 545 and the rear arm portion 546. As a result, the method for manufacturing the knuckle 50 can improve flowability of the molten metal in the front arm portion 545 and the rear arm portion 546.

Further, in the knuckle 50, rigidity of the damper mounting arm portion 542 can easily be changed by adjusting the thickness of the flange portions 545a, 546a or the flat plate portions 545b, 546b on the vehicle front-rear direction side as a whole or in part.

Even in this case, since the arm-portion opening S3 having the large opening area configured of the front arm portion 545 and the rear arm portion 546 is easily secured, according to the method for manufacturing the knuckle 50, the knuckle 50 with high degree of design flexibility can be casted while production efficiency is maintained.

Therefore, due to the front arm portion 545 and the rear arm portion 546 configured of the pairs of flange portions 545a and 546a and the flat plate portions 545b and 546b, respectively, the method for manufacturing the knuckle 50 can ensure favorable castability with which the knuckle 50 having a high degree of design flexibility is casted and, at the same time, molten metal flowability in the damper mounting arm portion 542 is improved.

In addition, the cylindrical opening S1 which is the inner space of the damper holding portion 541, the hollow opening S2 in which the inner space in the hollow portion 544 of the damper mounting arm portion 542 is continuous with the opening formed in the damper holding portion 541, and the arm-portion opening S3 which is surrounded by the front arm portion 545 and the rear arm portion 546 and has the opening area larger than the opening area of the hollow opening S2 are formed in the integral knuckle 50. Therefore, the knuckle 50 can ensure both suppression of vibration transmission from the front wheel 4 to the vehicle body and improvement in production efficiency.

Regarding correspondence between the configuration of the present invention and the above-described embodiment,
the wheel of the present invention corresponds to the front wheel 4 of the embodiment, and similarly,
the damper mounting portion corresponds to the damper holding portion 541,
the mounting arm portion corresponds to the damper mounting arm portion 542,
the automobile knuckle corresponds to the knuckle 50,
the main mold corresponds to the upper main mold 110 and the lower main mold 120,
the portion corresponding to the cylindrical opening corresponds to the cylindrical opening corresponding portion 131,
one side in the vehicle vertical direction corresponds to the vehicle upper side,
the portion corresponding to the arm-portion opening corresponds to the arm-portion opening corresponding portion 133,
the other side in the vehicle vertical direction corresponds to the vehicle lower side, and
the pillar-shaped portions correspond to the flange portions 545a, 546a.

However, the present invention is not limited only to the configuration of the above-described embodiment, and many embodiments may be obtained.

For example, in the above-described embodiment, a configuration is adopted where the hub bearing 40 is attached to the side surface of the knuckle 50; however, the present invention is not limited to this, and a hub bearing may be press-fitted into an opening hole of a knuckle.

In addition, the suspension device 10 supports the front wheels 4 that are driving wheels. However, the present invention is not limited to this, and a suspension device may support rear wheels that are driving wheels, or a suspension device may support front wheels or rear wheels that are driven wheels.

In addition, the cross section of the front arm portion 545 along the vehicle front-rear direction is a substantially I-shaped cross-section and the cross section of the rear arm portion 546 along the vehicle front-rear direction is a substantially gate shaped cross-section. However, the present invention is not limited to them and a front arm portion and a rear arm portion may have appropriate cross sections as long as each of the front arm portion and the rear arm portion is configured of flange portions and a flat plate portion having different length in the vehicle front-rear direction.

In addition, the low-rigidity portions P1, P2 that can be warped and deformed with respect to repeated loads applied to the front wheel 4 as vibration in the 160 Hz band are provided. However, the present invention not limited to this, and a frequency band may be set to an appropriate specific frequency band. For example, in a suspension device in which suppression of vibration transmission to a vehicle body is desired, an appropriate specific frequency band such as a peak frequency of the suspension device may be used.

Further, the low-rigidity portions P1, P2 lower in rigidity than the rigidity of the peripheral portion are provided. However, the present invention is not limited to this. A portion which is easily warped and deformed may be configured by using a difference in shape from the peripheral portion, a sectional shape, a section modulus, or a combination thereof as long as the portion can be warped and deformed with respect to repeated loads applied to the front wheel 4 as vibration in a specific frequency band.

In addition, the vicinity of the bearing mounting portion 51 in the front arm portion 545 is set to the low-rigidity portion P1. However, the present invention is not limited to this. The vicinity of the boundary between the front arm portion 545 and the bearing mounting portion 51, which is a location closer to the bearing mounting portion 51 than the vicinity of the bearing mounting portion 51 in the front arm portion 545 is, may be set to a low-rigidity portion P1. Alternatively, an appropriate location in the front arm portion 545 may be set to a low-rigidity portion P1.

In addition, the vicinity of boundary between the rear arm portion 546 and the bearing mounting portion 51 is set to the low-rigidity portion P2. However, the present invention is not limited to this. The vicinity of the bearing mounting portion 51 in the rear arm portion 546, which is a location closer to the damper holding portion 541 than the vicinity of the boundary between the rear arm portion 546 and the bearing mounting portion 51 is, may be set to a low-rigidity portion P2. Alternatively, an appropriate location in the rear arm portion 546 may be set to a low-rigidity portion P2.

In addition, the configuration is adopted where the low-rigidity portion P1 on the vehicle front side and the low-rigidity portion P2 on the vehicle rear side are formed at slightly different locations in the vehicle vertical direction. However, the present invention is not limited to this. Low-rigidity portions P1, P2 may be formed at substantially identical locations in the vehicle vertical direction.

In addition, in the manufacturing method, the mold 100 capable of casting the knuckle 50 in a state of being turned sideways with the damper holding portion 541 located at the lower side and the bearing mounting portion 51 located at the upper side is used. However, the present invention is not limited to this. In a manufacturing method, a mold capable of casting a knuckle 50 in a state of being turned sideways with a damper holding portion 541 located at an upper side and a bearing mounting portion 51 located at a lower side or in a state where the bearing mounting portion 51 is located on the upper side or the lower side with respect to the bearing mounting portion 51 may be used.

In addition, the first core print portion 134 extends from the cylindrical opening corresponding portion 131 of the core 130 to the vehicle upper side of the knuckle 50 and the second core print portion 135 extends from the arm-portion opening corresponding portion 133 to the vehicle lower side of the knuckle 50. However, the present invention is not limited to this. A first core print portion may extend from the cylindrical opening corresponding portion 131 to a vehicle lower side of a knuckle 50, and a second core print portion may extend from an arm-portion opening corresponding portion 133 to a vehicle upper side of the knuckle 50 as long as a configuration is adopted where a core is supported at two or more locations.

REFERENCE CHARACTER LIST 4 front wheel
20 damper
40 hub bearing
50 knuckle
51 bearing mounting portion
110 upper main mold
120 lower main mold
130 core
131 cylindrical opening corresponding portion
133 arm-portion opening corresponding portion
134 first core print portion
135 second core print portion
541 damper holding portion
542 damper mounting arm portion
544 hollow portion
545 front arm portion
545a flange portion
545b flat plate portion
546 rear arm portion
546a flange portion
546b flat plate portion
S1 cylindrical opening
S2 hollow opening
S3 arm-portion opening

The invention claimed is:

1. A method for manufacturing an automobile knuckle including a bearing mounting portion on which a hub bearing that rotatably supports a wheel of an automobile is mounted, a damper mounting portion which has a substantially cylindrical shape and holds a lower end of a damper whose upper end is supported on a vehicle body at a vehicle upper side and a vehicle inner side with respect to the bearing mounting portion, and a mounting arm portion which couples the bearing mounting portion and the damper mounting portion, the method comprising:
disposing one core in a main mold, the one core including a portion corresponding to
a cylindrical opening which is an inner space of the damper mounting portion,
a hollow opening in which an inner space in a hollow portion of the mounting arm portion is continuous with an opening formed in the damper mounting portion, the hollow portion extending with a closed cross section from an outer peripheral surface of the damper mounting portion, and
an arm-portion opening which is surrounded by a front arm portion of the mounting arm portion and a rear arm portion of the mounting arm portion, the front arm portion extending from the hollow portion to a front portion of the bearing mounting portion, the rear arm portion extending from the hollow portion to a rear portion of the bearing mounting portion, the arm-portion opening having an opening area larger than that of the hollow opening;
pouring molten metal into the main mold in a state where the one core is supported in the main mold; and
solidifying the molten metal while the molten metal is removed from a portion corresponding to the cylindrical opening, a portion corresponding to the hollow opening, and a portion corresponding to the arm-portion opening in an internal space of the main mold due to the one core, to cast the automobile knuckle which is integral.

2. The method for manufacturing the automobile knuckle according to claim 1, wherein
the one core has the portion corresponding to the arm-portion opening in which a range extending from a surface on a vehicle outer side of the bearing mounting portion to the hollow portion is opened in a vehicle vertical direction side and a vehicle width direction side, and
when the molten metal is poured into the main mold in a state where the core is supported in the main mold, the molten metal is removed from the portion corresponding to the arm-portion opening due to the one core to cast the automobile knuckle having the arm-portion opening.

3. The method for manufacturing the automobile knuckle according to claim 2, wherein the one core further includes a first core print portion which extends from the portion corresponding to the cylindrical portion to one side in a vehicle vertical direction, and a second core print portion which extends from the portion corresponding to the arm-portion opening to another side in the vehicle vertical direction, and when the molten metal is poured into the main mold in a state where the one core is supported in the main mold, the molten metal is removed from the portion corresponding to the cylindrical opening, the portion corresponding to the hollow opening, and the portion corresponding to the arm-portion opening due to the first core print portion and the second core print portion, to cast the automobile knuckle having the cylindrical opening, the hollow opening, and the arm-portion opening.

4. The method for manufacturing the automobile knuckle according to claim 3, wherein each of the front arm portion and the rear arm portion includes:

a pair of pillar-shaped portions each of which has a predetermined thickness in a vehicle front-rear direction side, and couples the bearing mounting portion and the hollow portion with a predetermined interval in a vehicle vertical direction side; and a flat plate portion which is interposed between the pair of pillar-shaped portions and has a thickness on the vehicle front-rear direction side thinner than the predetermined thickness.

5. The method for manufacturing the automobile knuckle according to claim 2, wherein each of the front arm portion and the rear arm portion includes:

a pair of pillar-shaped portions each of which has a predetermined thickness in a vehicle front-rear direction side, and couples the bearing mounting portion and the hollow portion with a predetermined interval in a vehicle vertical direction side; and a flat plate portion which is interposed between the pair of pillar-shaped portions and has a thickness on the vehicle front-rear direction side thinner than the predetermined thickness.

6. The method for manufacturing the automobile knuckle according to claim 1, wherein the one core further includes a first core print portion which extends from the portion corresponding to the cylindrical portion to one side in a vehicle vertical direction, and a second core print portion which extends from the portion corresponding to the arm-portion opening to another side in the vehicle vertical direction, and when the molten metal is poured into the main mold in a state where the one core is supported in the main mold, the molten metal is removed from the portion corresponding to the cylindrical opening, the portion corresponding to the hollow opening, and the portion corresponding to the arm-portion opening due to the first core print portion and the second core print portion, to cast the automobile knuckle having the cylindrical opening, the hollow opening, and the arm-portion opening.

7. The method for manufacturing the automobile knuckle according to claim 6, wherein each of the front arm portion and the rear arm portion includes:

a pair of pillar-shaped portions each of which has a predetermined thickness in a vehicle front-rear direction side, and couples the bearing mounting portion and the hollow portion with a predetermined interval in a vehicle vertical direction side; and a flat plate portion which is interposed between the pair of pillar-shaped portions and has a thickness on the vehicle front-rear direction side thinner than the predetermined thickness.

8. The method for manufacturing the automobile knuckle according to claim 1, wherein each of the front arm portion and the rear arm portion includes:

a pair of pillar-shaped portions each of which has a predetermined thickness in a vehicle front-rear direction side, and couples the bearing mounting portion and the hollow portion with a predetermined interval in a vehicle vertical direction side; and a flat plate portion which is interposed between the pair of pillar-shaped portions and has a thickness on the vehicle front-rear direction side thinner than the predetermined thickness.

* * * * *